US009882591B2

(12) United States Patent
Bevan et al.

(10) Patent No.: US 9,882,591 B2
(45) Date of Patent: *Jan. 30, 2018

(54) METHOD AND APPARATUS FOR PROCESSING OF INTERMODULATION PRODUCTS

(71) Applicant: AceAxis Limited, Harlow (GB)

(72) Inventors: David Damian Nicholas Bevan, Harlow (GB); Simon Gale, Harlow (GB); Fiona Wilson, Harlow (GB)

(73) Assignee: ACEAXIS LIMITED, Aylesbury (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,900

(22) Filed: Jul. 13, 2016

(65) Prior Publication Data

US 2016/0322995 A1    Nov. 3, 2016

Related U.S. Application Data

(63) Continuation of application No. 14/498,694, filed on Sep. 26, 2014, now Pat. No. 9,420,479, which is a
(Continued)

(30) Foreign Application Priority Data

May 21, 2012    (GB) .................... 1208918.1

(51) Int. Cl.
*H04B 1/10*    (2006.01)
*H04B 7/0413*    (2017.01)
(Continued)

(52) U.S. Cl.
CPC ............. *H04B 1/1027* (2013.01); *H04B 1/10* (2013.01); *H04B 1/123* (2013.01); *H04B 7/0413* (2013.01); *H04W 24/06* (2013.01); *H04W 24/08* (2013.01)

(58) Field of Classification Search
CPC .... H04B 1/1027; H04B 1/123; H04B 7/0413; H04B 1/10; H04W 24/06; H04W 24/08
(Continued)

(56) References Cited

U.S. PATENT DOCUMENTS 4,701,935 A * 10/1987 Namiki .............. H04B 7/15585
178/70 S
5,659,584 A    8/1997 Uesugi et al.
(Continued)

FOREIGN PATENT DOCUMENTS

CN    101379718 A    3/2009
CN    101502007 A    8/2009
(Continued)

OTHER PUBLICATIONS

International Search Report and Written Opinion dated Oct. 9, 2013 for corresponding PCT application PCT/GB2013/051319 filed May 21, 2013.
(Continued)

*Primary Examiner* — Tan H Trinh
(74) *Attorney, Agent, or Firm* — EIP US LLP

(57) ABSTRACT

Interference to a received signal is reduced in a wireless network, the interference comprising intermodulation products of at least a first signal and a second signal. Delayed interference signals comprising simulated intermodulation products are generated on the basis of the first signal and the second signal using a range of differing delay values and each of the delayed interference signals is correlated with the received signal to produce data representing a correlation for each delayed interference signal. At least one delay value is selected in dependence on a the data representative of the correlations and an interference signal comprising simulated intermodulation products generated from the first signal and
(Continued)

the second signal using the at least one delay value is combined with the received signal.

20 Claims, 13 Drawing Sheets

Related U.S. Application Data continuation of application No. 13/584,248, filed on Aug. 13, 2012, now Pat. No. 8,874,153.

(51) Int. Cl.
*H04B 1/12* (2006.01)
*H04W 24/06* (2009.01)
*H04W 24/08* (2009.01)

(58) Field of Classification Search
USPC ......... 455/296, 501, 63.1, 67.13, 114.2, 423, 455/295, 135, 150.1, 222, 266; 375/346, 375/350
See application file for complete search history.

(56) References Cited

U.S. PATENT DOCUMENTS

| | | | | |
|---|---|---|---|---|
| 5,675,581 | A * | 10/1997 | Soliman | H04W 16/10 370/252 |
| 5,749,051 | A | 5/1998 | Dent | |
| 6,542,112 | B1 | 4/2003 | Chen et al. | |
| 6,693,971 | B1 * | 2/2004 | Kowalski | H04B 15/00 375/285 |
| 6,704,349 | B1 | 3/2004 | Masenten | |
| 7,076,228 | B1 * | 7/2006 | Rilling | H04B 7/0848 455/278.1 |
| 7,127,211 | B2 * | 10/2006 | Hildebrand | H04B 1/525 455/295 |
| 7,346,134 | B2 | 3/2008 | Smith | |
| 7,773,967 | B2 | 8/2010 | Smith | |
| 8,170,487 | B2 | 5/2012 | Sahota et al. | |
| 8,249,540 | B1 | 8/2012 | Gupta | |
| 8,874,153 | B2 * | 10/2014 | Bevan | H04B 1/1027 375/346 |
| 8,983,454 | B2 * | 3/2015 | Bevan | H04B 1/1027 455/296 |
| 2002/0094785 | A1 * | 7/2002 | Deats | H04B 1/1027 455/67.13 |
| 2003/0016174 | A1 | 1/2003 | Anderson | |
| 2003/0122534 | A1 * | 7/2003 | Seppinen | H04B 1/109 324/76.51 |
| 2005/0276340 | A1 | 12/2005 | Chow et al. | |
| 2007/0049231 | A1 * | 3/2007 | Kemenczy | H04B 1/123 455/306 |
| 2008/0009254 | A1 | 1/2008 | Jin | |
| 2008/0039045 | A1 | 2/2008 | Filipovic et al. | |
| 2008/0159453 | A1 | 7/2008 | Smith | |
| 2009/0086864 | A1 * | 4/2009 | Komninakis | H04B 1/10 375/346 |
| 2009/0274460 | A1 | 11/2009 | Qian et al. | |
| 2010/0203840 | A1 | 8/2010 | Mouhouche | |
| 2011/0075754 | A1 | 3/2011 | Smith | |
| 2011/0149714 | A1 | 6/2011 | Rimini et al. | |
| 2011/0206171 | A1 | 8/2011 | Wu | |
| 2012/0140685 | A1 | 6/2012 | Lederer et al. | |
| 2012/0236976 | A1 | 9/2012 | Smith | |
| 2012/0289242 | A1 | 11/2012 | McCarthy | |
| 2012/0295558 | A1 | 11/2012 | Wang et al. | |
| 2013/0044791 | A1 | 2/2013 | Rimini et al. | |
| 2013/0082867 | A1 | 4/2013 | Malaga | |
| 2013/0102254 | A1 * | 4/2013 | Cyzs | H04B 1/126 455/63.1 |
| 2013/0010023 | A1 | 11/2013 | Matsunaga | |
| 2013/0310023 | A1 | 11/2013 | Bevan | |
| 2014/0105054 | A1 * | 4/2014 | Sægrov | H01Q 3/2605 370/252 |
| 2014/0162712 | A1 | 6/2014 | Feld | |
| 2015/0133111 | A1 | 5/2015 | Bevan | |
| 2015/0358144 | A1 * | 12/2015 | Fleischer | H04B 17/104 370/242 |

FOREIGN PATENT DOCUMENTS

| | | |
|---|---|---|
| CN | 101971506 A | 2/2011 |
| CN | 102246423 A | 11/2011 |
| CN | 102257734 A | 11/2011 |
| DE | 102010033841 A1 | 2/2012 |
| EP | 2104266 A2 | 9/2009 |
| WO | 2008021815 A1 | 2/2008 |
| WO | 2009082084 A1 | 7/2009 |
| WO | 2009088788 A1 | 7/2009 |
| WO | 2010106752 A1 | 9/2010 |

OTHER PUBLICATIONS

Rafie et al ."Simulation-Based Estimation of Intermodulation Distortion and C/IM", 1992, Globecom '92. Communication for Global Users. IEEE Global Telecommunications Conference, p. 700-706 vol. 2.

* cited by examiner $$(A\cos(a) + B\cos(b))^5 = \frac{5}{8}A^5\cos(a) + \frac{5}{16}A^5\cos(3a) + \frac{1}{16}A^5\cos(5a) +$$

$$\frac{5}{4}A^4B\cos(2a-b) + \frac{5}{16}A^4B\cos(4a-b) + \frac{5}{4}A^4B\cos(2a+b) +$$

$$\frac{5}{16}A^4B\cos(4a+b) + \frac{15}{8}A^3B^2\cos(a-2b) + \frac{5}{8}A^3B^2\cos(3a-2b) +$$

$$\frac{15}{8}A^3B^2\cos(a+2b) + \frac{5}{8}A^3B^2\cos(3a+2b) + \frac{15}{4}A^3B^2\cos(a) +$$

$$\frac{5}{4}A^3B^2\cos(3a) + \frac{5}{8}A^2B^3\cos(2a-3b) + \frac{15}{8}A^2B^3\cos(2a-b) +$$

$$\frac{15}{8}A^2B^3\cos(2a+b) + \frac{5}{8}A^2B^3\cos(2a+3b) + \frac{5}{16}AB^4\cos(a-4b) +$$

$$\frac{5}{4}AB^4\cos(a-2b) + \frac{5}{4}AB^4\cos(a+2b) + \frac{5}{16}AB^4\cos(a+4b) +$$

$$\frac{15}{8}AB^4\cos(a) + \frac{5}{8}A^4B\cos(b) + \frac{15}{4}A^2B^3\cos(b) +$$

$$\frac{5}{4}A^2B^3\cos(3b) + \frac{5}{8}B^5\cos(b) + \frac{5}{16}B^5\cos(3b) + \frac{1}{16}B^5\cos(5b)$$

$A = A_a(t); B = B_b(t) \rightarrow$ Amplitude Modulation (A.M.)

$a = 2\pi f_a t + \phi_a(t); b = 2\pi f_b t + \phi_b(t) \rightarrow$ carrier plus Phase Modulation (P.M.)

Figure 10

$$(A\cos(a) + B\cos(b) + C\cos(c))^3 = \tfrac{3}{4}A^3\cos(a) + \tfrac{1}{4}A^3\cos(3a) + \tfrac{3}{4}A^2B\cos(2a-b) + \tfrac{3}{4}A^2B\cos(2a+b) +$$
$$\tfrac{3}{4}A^2C\cos(2a-c) + \tfrac{3}{4}A^2C\cos(2a+c) + \tfrac{3}{4}AB^2\cos(a-2b) +$$
$$\tfrac{3}{4}AB^2\cos(a+2b) + \tfrac{3}{2}ABC\cos(a-b-c) + \tfrac{3}{2}ABC\cos(a+b-c) +$$
$$\tfrac{3}{2}ABC\cos(a-b+c) + \tfrac{3}{2}ABC\cos(a+b+c) + \tfrac{3}{2}AB^2\cos(a) +$$
$$\tfrac{3}{4}AC^2\cos(a-2c) + \tfrac{3}{4}AC^2\cos(a+2c) + \tfrac{3}{2}AC^2\cos(a) + \tfrac{3}{2}A^2B\cos(b) +$$
$$\tfrac{3}{2}A^2C\cos(c) + \tfrac{3}{4}B^3\cos(b) + \tfrac{1}{4}B^3\cos(3b) + \tfrac{3}{4}B^2C\cos(2b-c) +$$
$$\tfrac{3}{4}B^2C\cos(2b+c) + \tfrac{3}{4}BC^2\cos(b-2c) + \tfrac{3}{4}BC^2\cos(b+2c) +$$
$$\tfrac{3}{2}BC^2\cos(b) + \tfrac{3}{2}B^2C\cos(c) + \tfrac{3}{4}C^3\cos(c) + \tfrac{1}{4}C^3\cos(3c)$$

$A = A_a(t)$; $B = B_b(t)$; $C = C_c(t)$ → Amplitude Modulation (A.M.)

$a = 2\pi f_a t + \phi_a(t)$; $b = 2\pi f_b t + \phi_b(t)$; $c = 2\pi f_c t + \phi_c(t)$; → carrier plus Phase Modulation (P.M.)

Figure 12

METHOD AND APPARATUS FOR PROCESSING OF INTERMODULATION PRODUCTS

CROSS REFERENCE TO RELATED APPLICATIONS

This application is a continuation of U.S. application Ser. No. 14/498,694, filed on Sep. 26, 2014, which is a continuation of U.S. application Ser. No. 13/584,248, filed on Aug. 13, 2012 (now U.S. Pat. No. 8,874,153), which claims benefit under 35 U.S.C. 119(a) and 37 CFR 1.55 to UK patent application no. 1208918.1, filed on May 21, 2012. Each of the above-referenced patent applications is incorporated by reference herein in its entirety.

BACKGROUND OF THE INVENTION

Technical Field

The present invention relates generally to reduction of interference due to intermodulation products of transmitted signals in a wireless system, and more specifically, but not exclusively, to reduction of interference caused to a receiver due to Passive Intermodulation (PIM).

Background

Intermodulation products may be generated in a wireless system when two or more signals at different frequencies are transmitted along a signal path including a component having a non-linear transmission characteristic; these products differ in frequency from the signals from which they were generated, and may potentially cause interference to other signals. The generation of intermodulation products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station, it is likely that circumstances arise in which intermodulation products generated from transmitted carriers in one or more downlink bands would fall within an uplink band in which signals are received at the base station. Intermodulation generated by non-linear characteristics of active components such as power amplifiers may generally be dealt with at a design stage by appropriate frequency management and filtering, but intermodulation caused by non-linear characteristics of passive components, so called passive intermodulation (PIM), may prove more difficult to manage. Many passive components may exhibit a non-linear transmission characteristic to some degree, for example due to an oxide layer at a metal to metal contact, and the non-linear characteristic may develop with time as an ageing process of the component. Furthermore, PIM may be caused by components in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect.

Interference due to PIM may reduce the carrier to interference ratio at a receiver, which may reduce coverage by a cell significantly. Conventionally, as a solution to the problem of suspected interference caused by PIM in a cellular radio network, the source of the PIM may be tracked down by field engineers and a component causing the PIM may be replaced. However, this is labour intensive and relies on the problem being identified in order to alert the field engineers.

Automatic systems have been proposed for cancelling intermodulation products in the field of satellite communications, in which intermodulation products generated within a transmitter or receiver are cancelled using cancellation signals generated from baseband signals representing the carriers. In one version, a delay may be applied to the cancellation signals to align the cancellation signals with transmitter signals, so that intermodulation products may be cancelled from the transmitter signals before transmission from an antenna. The source of the intermodulation products in this version is assumed to be located at the transmitter, and the delay may be adjusted on the basis of a tone that is inserted into the transmitter signals. However, in many systems it is undesirable to modify a transmit signal by the use of a tone, and the source of the intermodulation products may not be known, so that the use of a tone may not be appropriate since it may be limited to adjustment of delay over a narrow range of values if aliasing between delay values is to be avoided.

In many wireless systems, for example cellular radio networks, a wide range of delay values is possible between the source of intermodulation products and a receiver, since the source of intermodulation products, and in particular PIM, may be unknown, and may be located at an any point in the transmit path. Also, it may be the case that signals which combine to produce intermodulation products may originate from different locations, and may experience different delays between a point at which they may be sampled and the location of the source of intermodulation products. Furthermore, in Multiple Input Multiple Output (MIMO) systems, signals that combine to produce intermodulation products may each be composed of signal components at the same frequency originating at different locations, typically different transmit antennas, so that the signal components may each experience a different delay.

A system for cancellation of intermodulation products may suffer from limited cancellation performance as a result of differential delays between a cancellation signal and a signal to be cancelled, due to changing signal content with time and due to a phase slope across the bandwidth of the signals. This is especially relevant to modern cellular radio systems such as LTE (Long Term Evolution) which may typically occupy, for example, 20 MHz bandwidth. Furthermore, limited performance will also result from differential delays between components of the signal, such as MIMO components with respect to the corresponding components of the cancellation signal.

Aspects of the invention address at least some of the limitations of the prior art systems.

SUMMARY

In a first exemplary embodiment of the invention, there is a method of reducing interference to a received signal in a wireless network, the interference comprising intermodulation products of at least a first signal and a second signal, the method comprising:

generating, on the basis of the first signal and the second signal, a plurality of delayed interference signals comprising simulated intermodulation products generated using a plurality of delay values;

correlating each of the delayed interference signals with the received signal to produce data representing a correlation for each delayed interference signal;

selecting at least one delay value of the plurality of delay values in dependence on a comparison of the data representative of the correlations; and combining, with the received signal, an interference signal comprising simulated intermodulation products generated from the first signal and the second signal using the at least one delay value.

This has an advantage that at least one delay value may be selected for use in generating the interference signal comprising simulated intermodulation products, the selected at least one delay value being for example at least one that produces the highest magnitude of correlation with the received signal. The selection of the highest magnitude of correlation indicates that the best cancellation of interference may result if the simulated intermodulation products generated using the selected at least one delay value are combined with the received signal. It is advantageous to generate, on the basis of the first signal and the second signal, a plurality of delayed interference signals comprising simulated intermodulation products using a plurality of delay values, since the plurality of delay values may be chosen to cover a range of delay values that may be expected. For example, the range of delay values may be round trip delay values from a source of the first and/or second signals via a source of intermodulation products to the apparatus. The delay values may be relative to the delay value of a direct path from the source of the first and/or second signals to the apparatus, the direct path being used to provide samples of the first and second signals at the apparatus. The source of the intermodulation products may be a source of passive intermodulation (PIM), which may be in the transmitter equipment, in the receiver equipment, or outside the transmitter or receiver in the propagation path at a typically unknown location, so that a wide range of delay values may be possible. Selecting at least one delay value on the basis of data representing a correlation is an efficient method of selecting delay value.

In a second exemplary embodiment of the invention, there is apparatus for reducing interference to a received signal in a wireless network, the interference comprising intermodulation products of at least a first signal and a second signal, the apparatus comprising:

at least one processor;

and at least one memory including computer program code;

the at least one memory and the computer program code being configured to, with the at least one processor, cause the apparatus to at least perform steps of:

generating, on the basis of the first signal and the second signal, a plurality of delayed interference signals comprising simulated intermodulation products generated using a plurality of delay values;

correlating each of the delayed interference signals with the received signal to produce data representing a correlation for each delayed interference signal;

selecting at least one delay value of the plurality of delay values in dependence on a comparison of the data representative of the correlations; and combining, with the received signal, an interference signal comprising simulated intermodulation products generated from the first signal and the second signal using the at least one delay value. Further features and advantages of the invention will be apparent from the following description of preferred embodiments of the invention, which are given by way of example only.

BRIEF DESCRIPTION OF THE DRAWINGS

FIG. 10 shows a mathematical expansion describing the generation of intermodulation products by an exponent 5 term in a non-linear transfer function.

FIG. 12 shows a mathematical expansion describing the generation of intermodulation products by mixing between three signals due to a power (exponent) 3 term in a non-linear transfer function.

DETAILED DESCRIPTION

By way of example, embodiments of the invention will now be described in the context of reduction of interference caused by passive intermodulation (PIM) in cellular wireless networks such as GSM, 3G (UMTS) and LTE (Long Term Evolution) networks comprising GERAN, UTRAN and/or E-UTRAN radio access networks, but it will be understood that embodiments of the invention may relate to other types of radio access network, for example IEEE 802.16 WiMax systems, and that embodiments of the invention are not restricted to cellular wireless system. Furthermore, embodiments of the invention may also relate to reduction of interference caused by intermodulation in active components.

Figure 1:
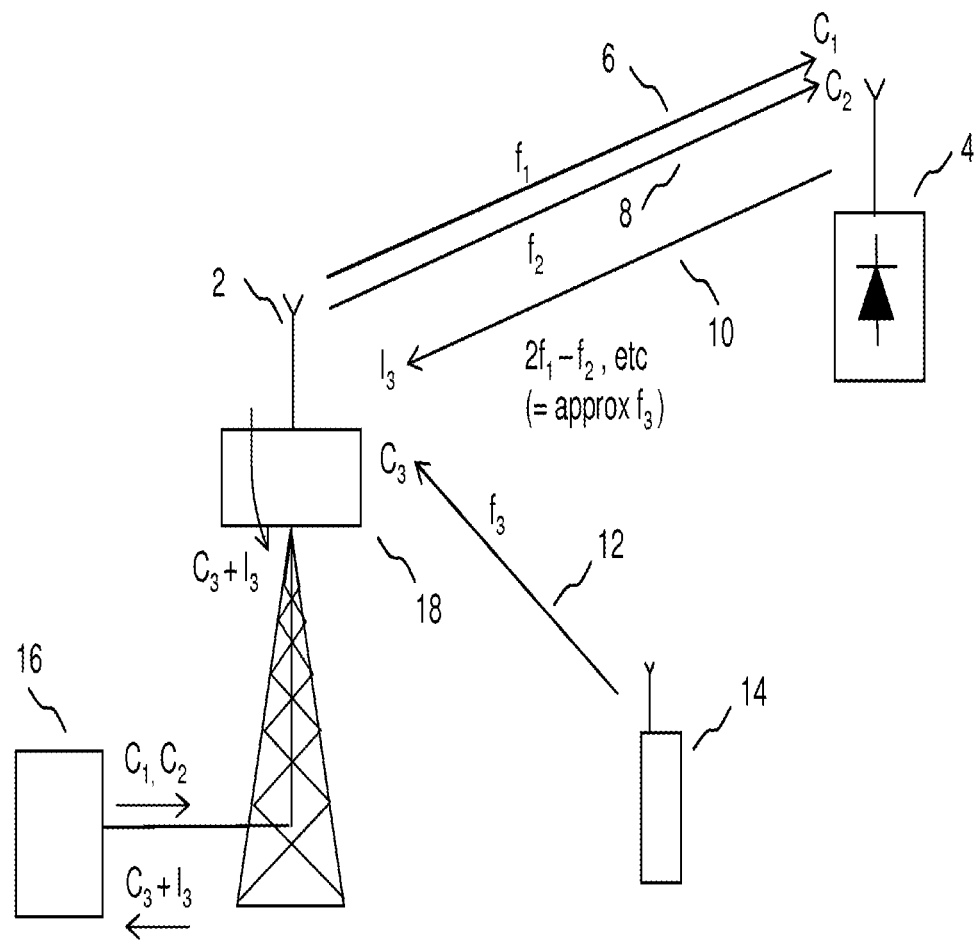
FIG. 1 is a is schematic diagram illustrating an example of interference caused by passive intermodulation.

FIG. 1 shows an example of interference to a received signal in a cellular wireless network. A first downlink signal $C_1$ and a second downlink signal $C_2$ are sent at baseband from a base station modem unit 16 to a Remote Radio Head (RRH) unit 18 as sample streams on a data link such as a Common Public Radio Interface (CPRI) data link. The data link carries both uplink and downlink CPRI data streams. The base station modem unit may be referred to as a baseband unit, and is typically, although not necessarily, mounted in a cabinet on the ground. The Remote Radio Head comprises upconverter and downconverter units and is typically, but not necessarily, mounted on a tower at the base station next to the antenna 2 or antennas. The first and second signals signal $C_1$ and $C_2$ are upconverted to radio frequency and are transmitted at frequencies $f_1$ 6 and $f_2$ 8 respectively. In the example shown in FIG. 1, the first and second signals impinge upon a source of passive intermodulation (PIM) 4, for example a metallic component having an oxide layer between metallic parts or comprising a ferromagnetic material. Intermodulation products of the first signal and the second signal are generated due to the non-linear response of the source of PIM 4.

Figure 2:
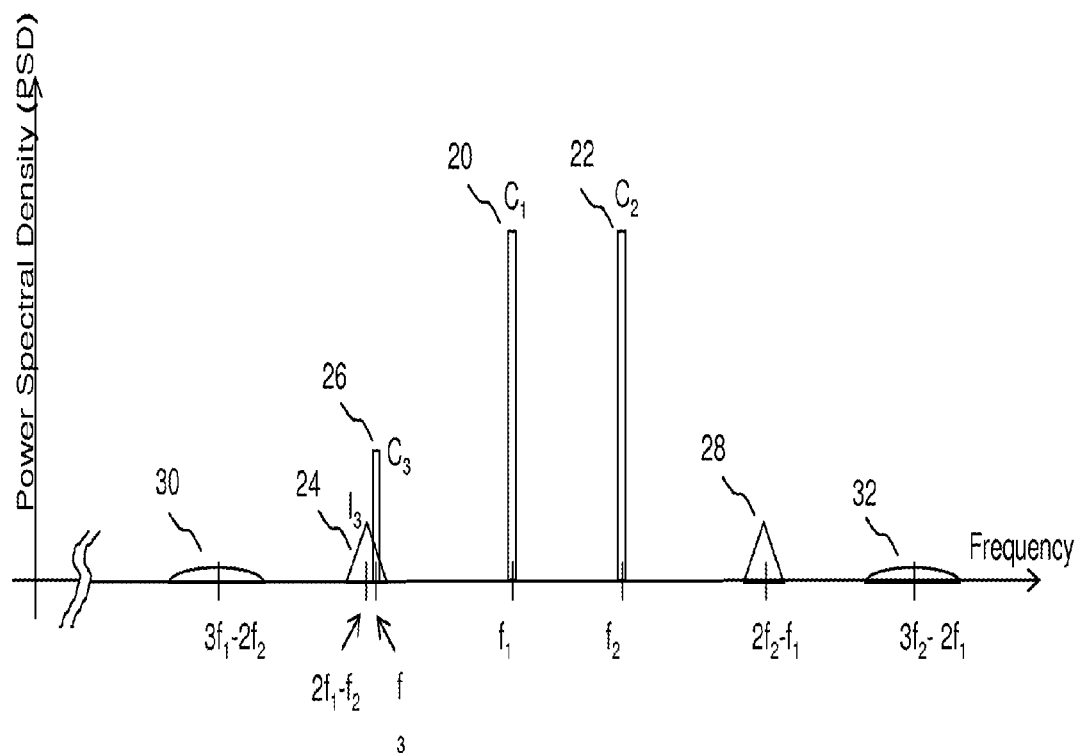
FIG. 2 is a schematic diagram illustrating intermodulation products in the frequency domain.

FIG. 2 shows intermodulation products in the frequency domain. It can be seen that the first signal 20 at frequency $f_1$ and the second signal 22 at frequency $f_2$ may produce, for example, third order products 26, 28 at frequencies $2f_1-f_2$ and $2f_2-f_1$, and fifth order products 30, 32 at frequencies $3f_1-2f_2$ and $3f_2-2f_1$. Other products (not shown) may also be generated.

In the case illustrated by FIG. 2, an uplink signal, i.e. a received signal $C_3$ 26 at frequency $f_3$ falls within the frequency spectrum occupied by the low side third order intermodulation products 24. It can be seen that there is typically an offset between the frequency of the received signal 26 and the centre of the frequency spectrum occupied by the low side third order intermodulation products 24, since there is typically no reason to expect the frequencies to be equal. The intermodulation products typically occupy a broader band than the signals from which they are generated, and there may be more than one received signal falling within the spectrum occupied by the intermodulation products.

Referring again to FIG. 1, it can be seen that intermodulation products 13 of the first and second signals are transmitted 10 from the PIM source 4, in this example at $2f_1-f_2$. The intermodulation products 13, in this example, fall at least in part, within a received uplink channel at $f_3$ and appear as interference to a received signal $C_3$ that is transmitted 12 at radio frequency from, for example, a user equipment 14 in communication with the base station. The received signal $C_3$ and the intermodulation products 13 appearing as interference to the received signal are typically downconverted to baseband in the RRH 18 and sent on the data link to the baseband/modem unit 16.

Figure 3:
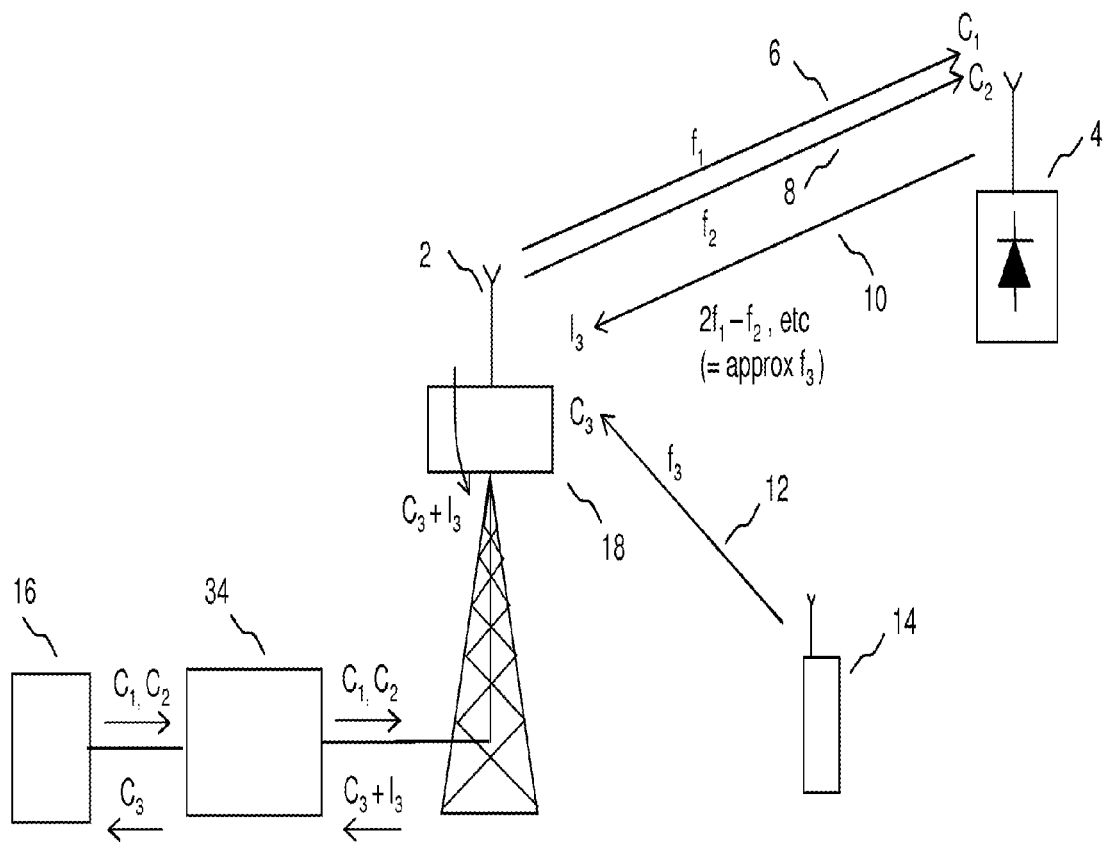
FIG. 3 is a schematic diagram illustrating reduction of interference caused by passive intermodulation, where the passive intermodulation is generated in an component external to the transmitter in embodiment of the invention.

FIG. 3 shows an embodiment of the invention, in which interference to a received channel is reduced. Apparatus according to an embodiment of the invention 34, which may be referred to as a PIM canceller, is inserted into the data link, typically the CPRI link, between a base station modem unit and a radio head unit. For example, the apparatus may be retro-fitted in an existing installation as an appliqué unit, by breaking into the existing data link and connecting the apparatus in series with the data link.

Figure 4:
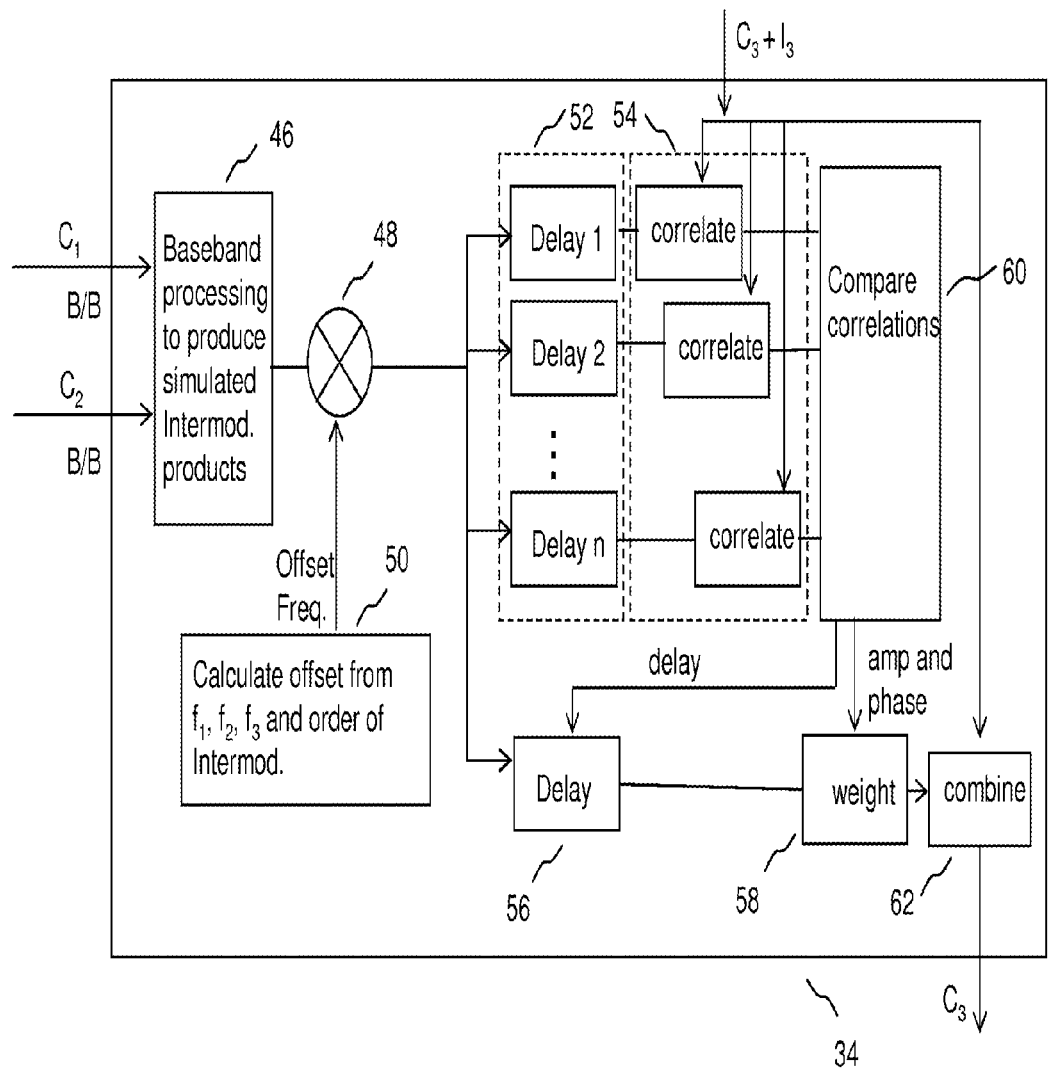
FIG. 4 is schematic diagram showing apparatus for reduction of interference on a single receive channel caused by passive intermodulation in an embodiment of the invention.

FIG. 4 shows the PIM canceller 34 in more detail, showing an example of an arrangement for reduction of interference to a received signal on a single receive channel caused by intermodulation products of at least the first signal and the second signal, the first and second signals being downlink signals. The first and second signals $C_1$ and $C_2$, as shown in FIG. 3, are received at baseband at the apparatus, for example from the data link from the base station modem unit. The PIM canceller may select the first signal $C_1$ and the second signal $C_2$ on the basis of a determination of which downlink signal frequencies may produce intermodulation products that may fall within a channel of interest that carries the received signal, based on well-known relationships between signal frequencies and the frequencies of intermodulation products produced from those frequencies. On the basis of this determination, the appropriate first and second downlink signals $C_1$ and $C_2$ may be selected for generation of simulated intermodulation products. On the basis of the first signal and the second signal, simulated intermodulation products are generated 46. The intermodulation product or products that are generated may be selected on the basis of which intermodulation products would be expected to fall in the channel of interest. In the embodiment shown, the simulated intermodulation products are delayed 52 by a plurality of delay values (Delay 1 . . . Delay n) to generate a plurality of delayed interference signals comprising simulated interference products. In other embodiments, a plurality of delays may be used to generate the plurality of delayed interference signals by applying delays to one or both of the first and second signals before simulated intermodulation products are generated. The plurality of delays may have, for example, a range of values greater than 100 ns, and a range values greater than 200 ns may be advantageous, since the source of intermodulation products may be outside the transmitter or receiver in an unknown location.

The received signal $C_3$ having interference comprising intermodulation products 13 of at least the first signal and the second signal is received at the PIM canceller, for example from the uplink data link at baseband as shown in FIG. 4 as $C_3+I_3$. Each of the delayed interference signals is correlated with the received signal to produce a data representing a correlation 54 for each delayed interference signal. The data representing a correlation may be, for example, the magnitude of the correlation. Then, at least one delay value is selected from the plurality of delay values in dependence on the data representative of the correlations; for example, the delay value may be selected that resulted in the greatest correlation magnitude. The selected at least one delay value is passed to a delay block 56 and is used to generate an interference signal comprising simulated intermodulation products generated from the first signal and the second signal. In the embodiment shown in FIG. 4, the interference signal comprising simulated intermodulation products is generated by a process involving delaying simulated interference products produced at baseband in block 46 by the selected delay value. The generated interference signal is then combined with the received signal. The combination is preferably in antiphase, that is to say a subtraction, so that the interference in the received signal is cancelled or reduced. The combination process may comprise weighting the interference signal, for example in amplitude and phase according to amplitude and phase values derived from data representing the correlation as shown in FIG. 4 at block 58, and combining the weighted interference signal with the received signal, as shown at block 62. As shown in FIG. 4, the received signal $C_3$ may be output from the PIM canceller with the interference cancelled or reduced, for example on the data link to the modem unit.

In an alternative to the embodiment shown in FIG. 4, the production of simulated intermodulation products may be carried out separately for a first application of generating the plurality of delay values for the purposes of generating a correlation and for a second application of generating simulated interference products for the purposes of combining with the received signal to reduce or cancel the interference. The first application does not need to be carried out in real time, since selecting a delay value can be a background activity which may involve a periodic update of delay value. The second application is preferably carried out in real time, so that simulated interference products can be generated at a sufficient rate that interference can be effectively cancelled or reduced.

So, for example, generation of simulated intermodulation products for the first application may be carried out in such a way, for example by software, that the simulated intermodulation products for the first application are generated after the first signal and the second signal from which the simulated intermodulation products were generated are output from the canceller, on for example the data link to the baseband/modem unit 16. By contrast, generation of simulated intermodulation products for the second application may be carried out in such a way, for example by hardware such as a gate array, that the simulated intermodulation products for the second application are generated before the first signal and the second signal from which the simulated intermodulation products were generated are output from the canceller, so that the interference can be effectively cancelled or reduced in real time using the simulated intermodulation products.

The delay values from which a delay value is selected may be arranged to cover an expected range of delay values. For example, the range of delay values may be round trip delay values from a source of the first and/or second signals via a source of intermodulation products to the apparatus. The delay values may be relative to the delay value of a direct path from the source of the first and/or second signals to the apparatus, the direct path being used to provide samples of the first and second signals at the apparatus. The source of the intermodulation products may be a source of passive intermodulation (PIM), which may be in the transmitter equipment, in the receiver equipment, or outside the transmitter or receiver in the propagation path at a typically unknown location, so that a wide range of delay values may be possible.

The processing of the first signal and the second signal at baseband to produce baseband intermodulation products may be carried out as follows. Considering, for example, generation of third order intermodulation products of two signals, having amplitude modulation A and B respectively, and a phase comprising carrier phase and phase modulation a and b respectively. Products due to a non-linearity with exponent 3 are given by:

$$(A \cos(a) + B \cos(b))^3$$

which may be expanded to give:

$$\frac{1}{4}(3 A^3 \cos(a) + A^3 \cos(3a) + 3 A^2 B \cos(2a - b) +$$
$$3 A^2 B \cos(2a + b) + 3 A B^2 \cos(a - 2b) + 3 A B^2 \cos(a + 2b) +$$
$$6 A B^2 \cos(a) + 6 A^2 B \cos(b) + 3 B^3 \cos(b) + B^3 \cos(3b))$$

The terms of the expansion which are of interest, in that they may fall in an uplink receive band, are the terms $3A^2B$ cos (2a−b), which represents the lower third order product as shown in FIG. 2 as $I_3$ as indicated by reference numeral 24, and $3AB^2$ cos (a−2b), which may also be written as $3AB^2$ cos (2b−a), which represents the upper third order product as shown as indicated in FIG. 2 by reference numeral 28. Products which appear at the fundamental frequencies, and at or around the third harmonics, need not be generated as baseband intermodulation products in the PIM canceller, since they may be filtered out at a victim receiver. Which of the 'upper' or 'lower' products falls in an uplink receive band will depend upon whether the uplink band is allocated above or below the downlink band. The mathematics above shows that the intermodulation products contain amplitude and phase modulation which is a function of modulation of the first and second signals which generated the intermodulation products, and that baseband intermodulation products may be generated in the PIM canceller from the knowledge of the amplitude and phase of the first and second signals; this information is available in a baseband representation of the first and second signals.

However, it may be necessary to frequency shift the intermodulation products generated at baseband to produce the simulated intermodulation products suitable for cancelling interference in the received signal, so that simulated intermodulation products are aligned in frequency with the intermodulation products in the interference to the received signal. This is because, as shown in FIG. 2, the centre frequency of the intermodulation products interfering with the received signal may not correspond with the centre frequency of the received uplink channel of the received signal, but may be offset by an offset frequency.

FIG. 4 shows frequency shifting of the baseband intermodulation products, as represented by mixing function 48 and offset frequency calculation function 50. The frequency shifting comprises shifting by a frequency determined by at least a frequency of a channel in which the received signal is received, a frequency of the first radio frequency signal, and a frequency of the second radio frequency signal.

There may also be a need, in some embodiments, to adjust the frequency of the frequency shift by a correction factor, which may be a correction, also known as a fine frequency adjustment, applied in addition to the frequency shift determined by calculation from knowledge of the frequency of a channel in which the received signal is received, the frequency of the first radio frequency signal, and the frequency of the second radio frequency signal. The frequency shifting may comprise shifting by a frequency determined by adjusting the frequency shift to a plurality of frequency shift values and selecting a frequency for the frequency shifting shift on the basis of data representing a correlation of a delayed interference signal with the received signal for each of the plurality of frequency shift values. So, for example, the frequency shift may be selected that gives the largest correlation magnitude. In this way, a frequency shift value may be adjusted to remove an unknown component to the offset between the frequency of the channel in which the received signal is received and the frequency of the intermodulation products in the interference to the received signal. The unknown component to the frequency offset may, for example, be caused if the precise frequency relationship between frequencies used to upconvert the first and/or second signals and the frequency used to downconvert the received signal is not known.

Figure 5:
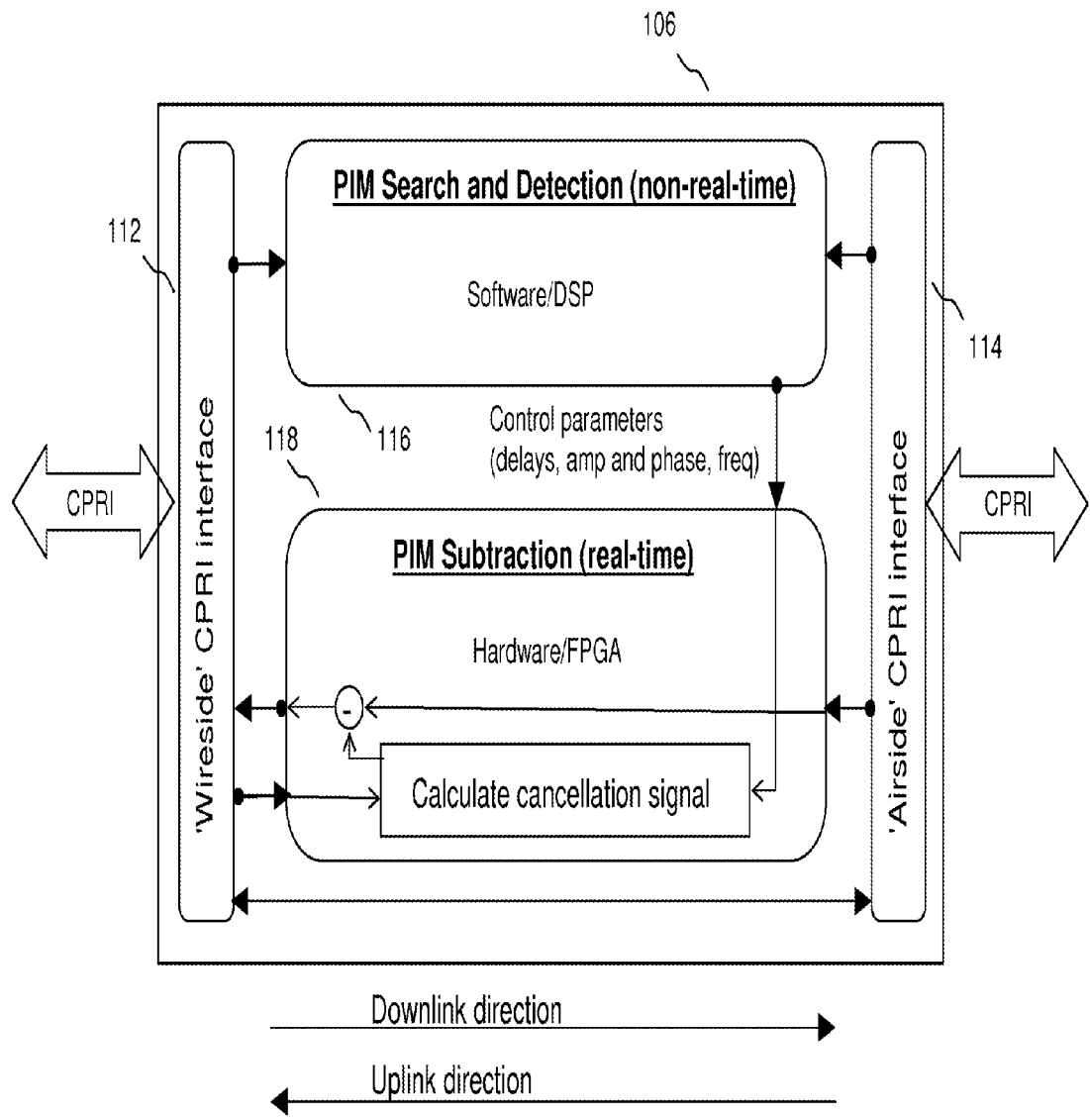
FIG. 5 is a schematic diagram showing apparatus comprising a first processor part and a second processor part in an embodiment of the invention.

FIG. 5 is a schematic diagram showing apparatus 106 according to an embodiment of the invention, which may be a PIM canceller, arranged with a first processing part 116 and a second processing part 118. The first and second processing parts may be implemented using different technology.

The first processing part may be arranged to perform what may be termed PIM search and detection functions, which need not be performed in real time, and may be performed with software running on a digital signal processor. The second processor part may be arranged to perform what may be termed PIM calculation and subtraction functions, which need to be performed in real time, and which may be implemented as a hardware gate array, such as a Field Programmable Gate Array.

For example, the first processing part may be arranged to correlate each of the delayed interference signals with the received signal to produce data representing a correlation for each delayed interference signal, and to select at least one delay value in dependence on a comparison of the data representative of the correlations. The second processing part may be arranged to combine, with the received signal, the interference signal comprising simulated intermodulation products generated from the first signal and the second signal using the at least one delay value. In this way, the apparatus may be implemented efficiently, by using a type of technology appropriate to each processing part.

As shown in FIG. 5, the first processing part may be arranged to generate and send an indicator of the at least one selected delay value to the second processing part, Typically, the first processing part comprises a processor and memory, which are arranged to execute software instructions to generate the indicator. Also, the first processing part may generate and send values of amplitude, phase and frequency to the second processing part, for use in generating the simulated intermodulation products.

The second processing part may be arranged to generate simulated intermodulation products at baseband from the first signal and the second signal using the at least one delay value indicated by the indicator, at a sampling rate of at least the sampling rate of the received signal. As a result, the second processing part may process data in real time, so that interference in the received signal may be continuously reduced or cancelled in real time, without introducing undue delay into the receive path for the uplink.

As shown in FIG. 5, the apparatus comprises a first interface, typically a CPRI interface, for connection to the base station modem unit and a second interface, also typically a CPRI interface, for connection to the radio head unit, the first interface being arranged to receive downlink data representing at least the first signal and the second interface being arranged to receive uplink data representing at least the received signal. The first interface is also arranged to output modified uplink data representing at least the received signal in which the received signal is combined with the interference signal comprising simulated intermodulation products generated from the first signal and the second signal.

Figure 6:
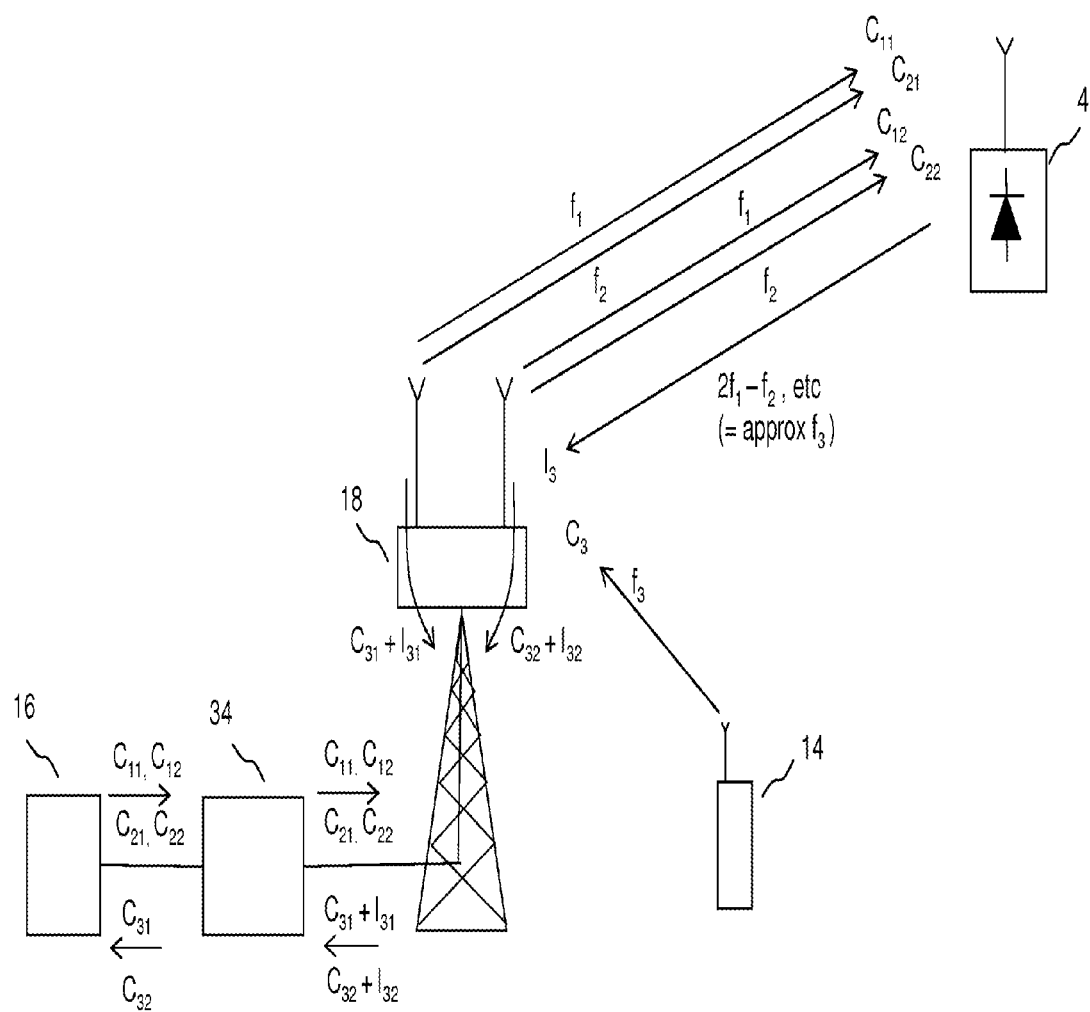
FIG. 6 is a schematic diagram illustrating reduction of interference caused by passive intermodulation in an embodiment of the invention in a wireless system using MIMO transmission and reception in an embodiment of the invention.

FIG. 6 shows an embodiment of the invention in a wireless network using MIMO (Multiple Input Multiple Output) transmission and reception. As shown in FIG. 6, the base station transmits and receives using multiple antennas; in this example, two antennas are shown, but more than two may be used.

As shown in FIG. 6, a first signal transmitted a frequency $f_1$ may have two MIMO components $C_{11}, C_{12}$, each carrying a MIMO data stream, each transmitted from a different antenna. Also, a second signal transmitted at frequency $f_2$ may also have two MIMO components $C_{21}, C_{22}$, also each carrying a MIMO data stream, each transmitted from a different antenna than the other. If the components of the first and second signals impinge upon a PIM source 4, PIM signals may be generated from the first and second signals. However, in order to simulate the PIM signals that are generated, it is necessary to know the relative amplitudes and phases of the components of each signal, and also the delay of each component, at the PIM source. This is because it is the superposition i.e. the vector sum, of the components of the first signal that interacts with the superposition of the components of the second signal to generate the PIM intermodulation products, shown as 13 in FIG. 6.

A received signal $C_3$ is received at the base station at a frequency which falls within the spectrum occupied by the PIM intermodulation products. However, as shown in FIG. 6, the received signal is received by two antennas at the base station, as components $C_{31}$ and $C_{32}$, and similarly the PIM intermodulation products are received on two antennas, as components $I_{31}$ and $I_{32}$.

Figure 7:
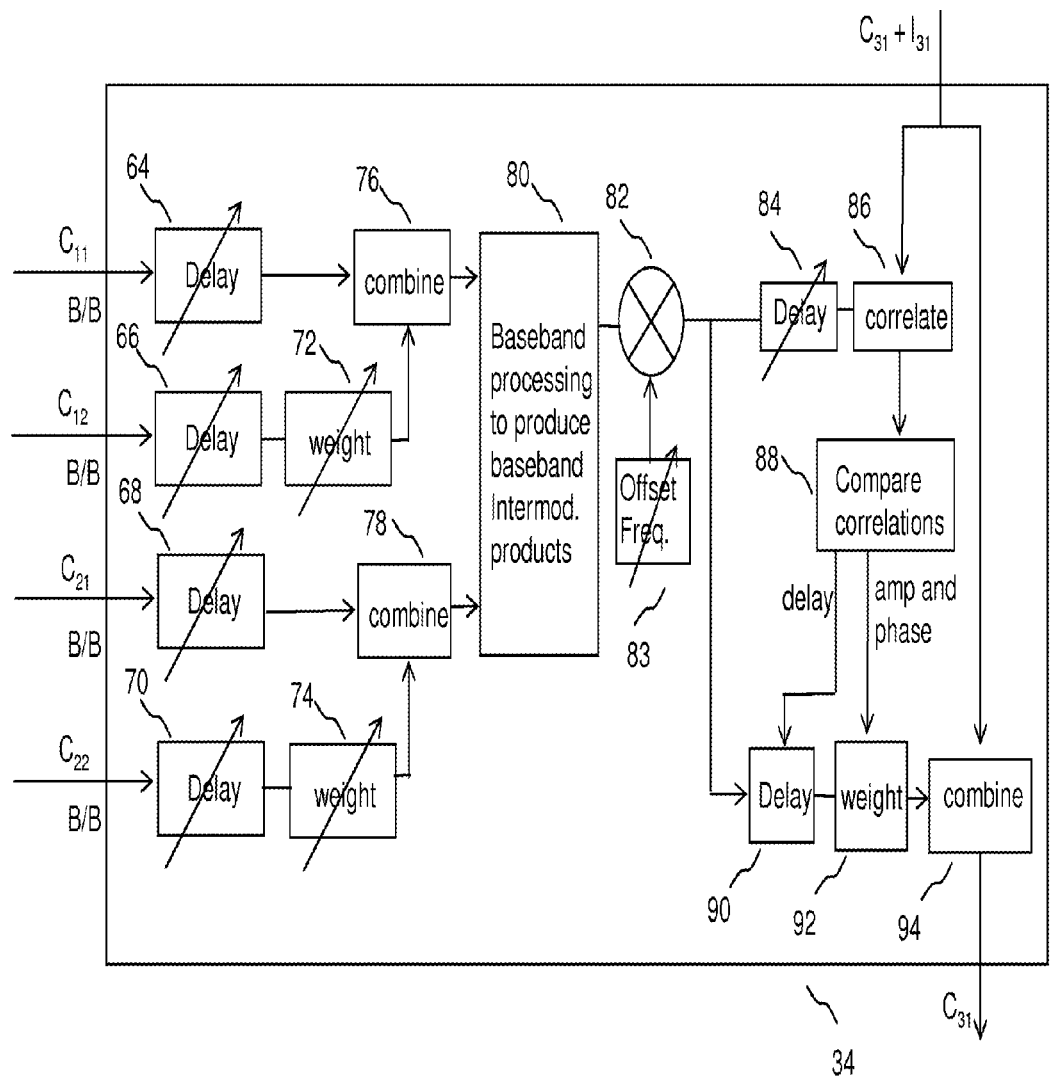
FIG. 7 is schematic diagram illustrating apparatus for reduction of interference on a single received MIMO stream caused by passive intermodulation between two signals each having two MIMO components in an embodiment of the invention.

FIG. 7 shows interference reduction apparatus, which may be referred to as a PIM canceller, for the MIMO case. Only one receive antenna channel is shown. As can be seen, the MIMO components of the first signal, $C_{11}, C_{12}$ obtained for example from the CPRI downstream data, are adjusted in amplitude and phase by weight 72 and adjusted in delay 64, 66 and then combined for input to the baseband processing function 80. Similarly, the MIMO components of the second signal, $C_{21}, C_{22}$ obtained for example from the CPRI downstream data, are adjusted in amplitude and phase by weight 74 and adjusted in delay 68, 70 and then combined for input to the baseband processing function 80. The processing function generates intermodulation products based on the combined components of the first signal and the combined components of the second signal. An offset frequency is applied to generate interference signals comprising simulated intermodulation products offset from baseband so as to align in frequency the simulated intermodulation products with the interference to the received signal, as previously described in connection with FIG. 4. The generated interference signals are correlated with the received signal and a search is performed over the each of the delay values 64, 66, 68, 70 and weights 72, 74, and, if appropriate, frequency offsets to find the combination of parameters that produces the greatest magnitude of correlation. This combination of parameters is then used to generate an interference signal comprising simulated intermodulation products for combination with the received signal, in order to reduce or cancel interference in the received signal. In the embodiment shown in FIG. 7, the same baseband processing block 80 is used to generate baseband intermodulation products for use in trial correlations to determine the combination of parameters, as is also used to generate the interference signal comprising simulated intermodulation products for combination with the received signal. It can be seen that a trial delay block 84 may be set to a range of trial values, and the value corresponding to the highest correlation from the correlate block 86 as selected by the Compare Correlations functional block 88. The output of the baseband processing block 80, suitably offset in frequency by the mixer functional block 82, is subject to a delay 90 as determined using the trial delay block 84 and a weight determined from the amplitude and phase of the correlation for the selected combination of parameters, and is then combined with the received signal in the combine functional block 94 in order to reduce or cancel the interference.

In alternative embodiments the separate baseband processing blocks may be used to generate baseband intermodulation products for use in trial correlations to determine the combination of parameters, and to generate the interference signal comprising simulated intermodulation products for combination with the received signal. This may allow an appropriate technology to be used for real time and non-real time processing parts as already mentioned.

In FIG. 7, the adjustable delay blocks are shown for example only; it is not necessary for the delays to be applied sequentially, since different delay values may be tried in parallel, similar to the situation shown in FIG. 4, if parallel correlation channels are provided. Similarly, delays may be applied sequentially in the situation of FIG. 4; the two approaches are interchangeable, the choice being a trade off between speed of selection and processing load.

The processing steps involved in the case where the first signal has at least a first component and a second component, each component having been transmitted from a different antenna, are as follows. Delayed interference signals are generated using each of a range of delay values 64 for the first component and a range of delay values 66 for the second component. For each of the delay values of the first component and for each of the delay values for the second component, the respective delayed interference signal is correlated with the received signal to produce data representative of a correlation, such as a correlation magnitude, for each of a range of amplitude values and for each of a range of phase values for the second component, that is to say a range of weight values 72. An amplitude value and a phase value of the second component, a delay value of the first component, and a delay value of the second component is selected in dependence on a comparison of the data representative of the correlations, for example, the values corresponding to the highest magnitude of the correlation may be selected. The interference signal may be generated using the selected amplitude value and selected phase value of the second component, the selected delay value of the first component, and the selected delay value of the second component. The interference signal may then be combined with the received signal to reduce or cancel intermodulation products in the received signal. The amplitude values and phase values of the second component may be relative values, being relative to the amplitude and phase of the first component.

The processing steps involved in the case where the first signal comprises a further component of the first signal having been transmitted from an antenna not used to transmit the first component of the first signal or the second component of the first signal, for example a third MIMO stream, are as follows. Delayed interference signals are generated using, additionally to the case for two MIMO streams, each of a range of delay values for the further component. For each of the plurality of delay values of the first component, for each of the plurality of delay values for the second component, and for each of the plurality of delay values of the further component, the respective delayed interference signal is correlated with the received signal to produce data representative of a correlation, for example a magnitude of the correlation, for each of a plurality of amplitude values and for each of a plurality of phase values for each of the second and further components. An amplitude value and a phase value of each of the second component and the further component is selected and a delay value of the first component, a delay value of the second component and a delay value of the further component is selected in dependence on a comparison of the data representative of the correlations. Typically the parameter values corresponding to the greatest magnitude of the correlation are selected. The interference signal may be generated using the selected amplitude value and the selected phase value of each of the second component and the further component and the selected delay value of the first component, the selected delay value of the second component and the selected delay value of the further component. The interference signal may then be combined with the received signal to reduce or cancel intermodulation products in the received signal.

The processing steps involved in the case where the second signal comprises at least a first component of the second signal and a second component of the second signal, each of the first and second components of the second signal having been transmitted from a different antenna from the antenna used to transmit the other, that is to say, for example, the second signal has two MIMO components, are as follows. For each of the plurality of delay values of the first component of the first signal, for each of the plurality of delay values for the second component of the first signal, for each of the plurality of delay values of the first component of the second signal, and for each of the plurality of delay values for the second component of the second signal, the respective delayed interference signal is correlated with the received signal to produce data representative of a correlation for each of a plurality of amplitude values and for each of a plurality of phase values for each of the second component of the first signal and the second component of the second signal. An amplitude value and a phase value of the second component of the first signal and the second component of the second signal is selected and a delay value of the first component of the first signal, a delay value of the second component of the first signal, a delay value of the first component of the second signal, and a delay value of the second component of the second signal is selected in dependence on a comparison of the data representing the correlations. The interference signal is generated using the selected amplitude value and the selected phase value of the second component of the first signal and the second component of the second signal and the selected delay value of the first component of the first signal, the selected delay value of the second component of the first signal, the selected delay value of the first component of the second signal, and the selected delay value of the second component of the second signal. The interference signal may then be combined with the received signal to reduce or cancel intermodulation products in the received signal.

Figure 8:
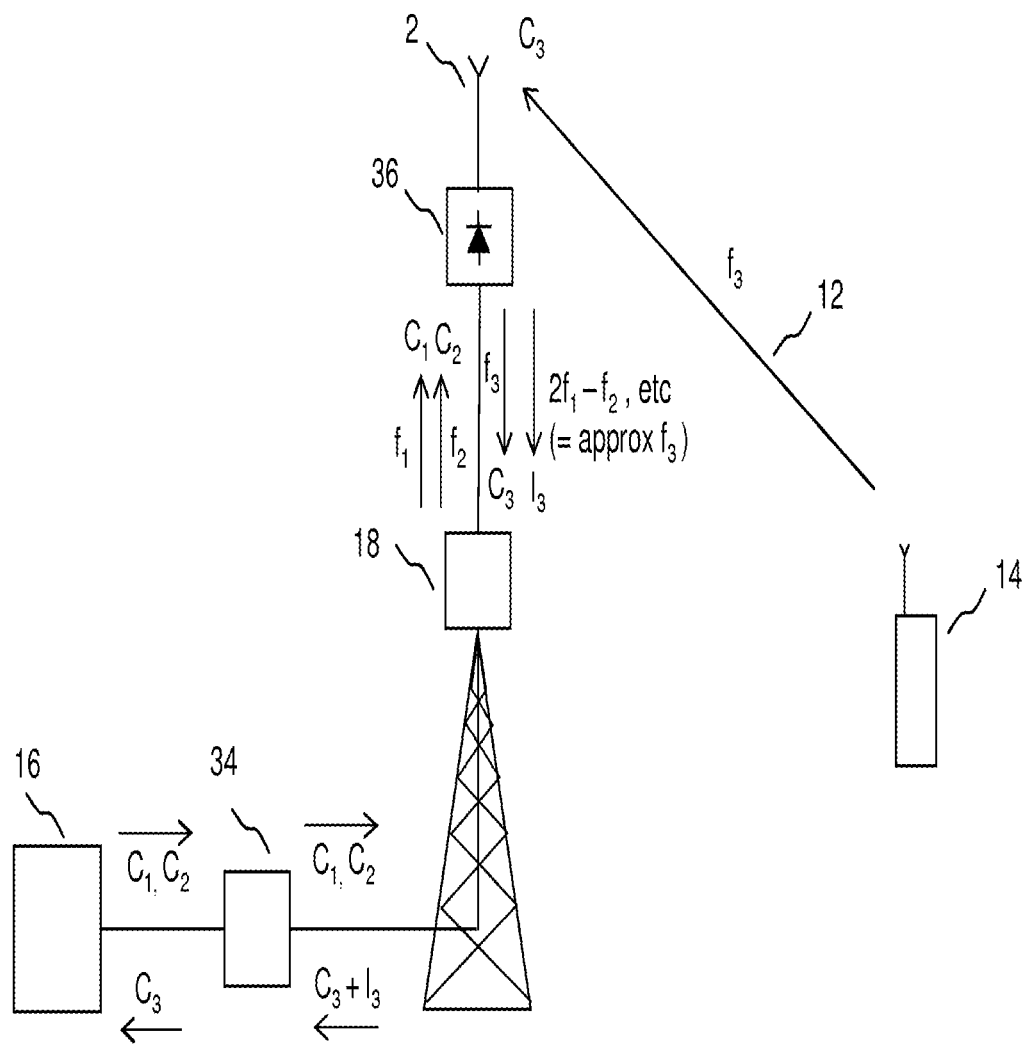
FIG. 8 is a schematic diagram illustrating reduction of interference caused by passive intermodulation, where the passive intermodulation is generated in the signal path of the transmitter in an embodiment of the invention.

FIG. 8 shows an application in which the intermodulation products causing interference to the received signal are generated within the transceiver at the base station, for example passive intermodulation (PIM) in the diplexer or antenna or active intermodulation in an active component. However, provided that the appropriate delays are available for selection for use in generating the interference signal comprising simulated intermodulation products, the interference may be reduced or cancelled as previously described for the case of the external PIM source.

Figure 9:
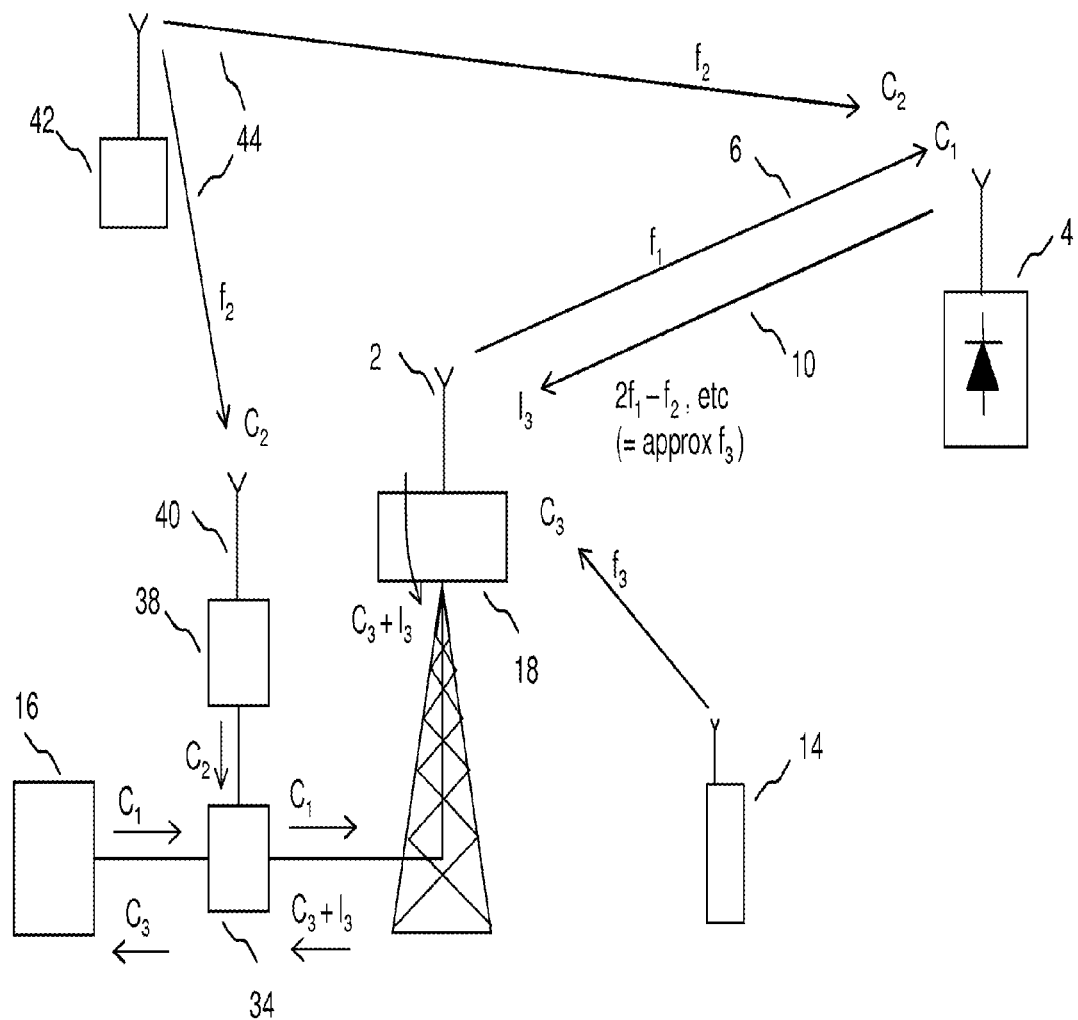
FIG. 9 is a schematic diagram illustrating reduction of interference caused by passive intermodulation, where one of the signals that generated the passive intermodulation is received by an antenna and passed to the canceller in an embodiment of the invention.

FIG. 9 shows the case where an antenna 40 is provided for receiving at least the second signal, so that at least the second signal may be received if a downlink datastream comprising at least the second signal is not available. For example, the second signal may originate from equipment 42 that does not share the same remote radio head 18 as the first signal. The second signal may be a signal used by a different operator from the operator of the first signal and the received signal. In one embodiment of the invention, a single antenna may be used to receive both the first and second signals, for example in the case that neither the first nor the second signal is available in a CPRI interface. Alternatively, the apparatus may comprise a further antenna for receiving at least the first signal. A directional antenna may be used for receiving each of the first and second signals in the case that the source of the first and second signals is at a different direction with respect to the apparatus.

The apparatus may comprise a receiver 38 arranged to receive at least the second signal from the antenna and to provide a baseband representation of the second signal for use in generating the interference signal comprising simulated intermodulation products, so that a baseband representation of the second signal may be provided in cases where access is not available to a data link on which the baseband representation of the second signal is available. It may be that the first signal is available from a data link but the second signal is not. In an alternative embodiment, the apparatus may further comprise a second receiver arranged to receive at least the first signal from the antenna and to provide a baseband representation of the first signal for use in generating the interference signal comprising simulated intermodulation products.

As a variation of the embodiment of FIG. 9, the receiver may be equipped with two or more antennas and arranged to receive one or more signals each having two or more MIMO components, similar to the situation shown in FIG. 6, but in the case that the first or second signal is not available on the data link from the baseband unit 16. For example, first and second MIMO components $C_{11}$, $C_{12}$ of the first signal may be received in a first complex scalar relationship $aC_{11} + bC_{12}$ at the first antenna and in a second complex scalar relationship $cC_{11} + dC_{12}$ at the second antenna, where a, b, c, d are complex scalars representing the different polarisation factors and path lengths to each receive antenna from respective MIMO transmit antennas at the base station (assuming, for simplicity, frequency flat/non-dispersive channels, and using complex baseband representations of signals). As a result, the canceller may not have access directly to each transmitted MIMO component. However the MIMO components may be separated from the composite signals received at the antennas. For example the composite signals may be connected to a weighting function block in which, for each of frequency $f_1$ and $f_2$, each composite signal is weighted by variable weights and combined with weighted composite signal from the other antenna. The weights may be controlled such that, when the weighted components are combined, the separate MIMO components are produced. The separate MIMO components may then be processed as described in connection with FIG. 7. The weights of the weighting functions may be determined by a search of weight values, on the basis of the data representing the correlation, for example searching for the highest correlation. Alternatively, the weights may be determined by use of conventional methods to separate the MIMO components, using pilot tones to distinguish the MIMO components. A conventional 'Blind Source Separation' (BSS) signal processing technique, such as 'Independent Component Analysis' (ICA) may also be used to separate the MIMO components.

In embodiments of the invention, the delay value that is selected in dependence on data representative of the correlation may be a delay value that is applied to simulated intermodulation products generated from the first and second signal to form the delayed interference signals, that is to say the delay is applied after the simulated intermodulation products are generated. Alternatively, the delay value that is selected in dependence on data representative of the correlation may be a delay value that is a value of a delay applied to the first signal to form the delayed interference signals, and/or the delay value may be a value of a delay applied to the second signal to form the delayed interference signals. The delay value applied to the first signal may be different from the delay value applied to the second signal, for example where the delay from the first and second signals to the source of intermodulation products is different, for example where the first and second signals are transmitted from different antennas and the delay of each to an external PIM source is different.

In embodiments of the invention, an equaliser may be substituted for some or all of the variable delay blocks, and the settings of the equaliser may be selected on the basis of the data representative of the correlations for trial values of the equaliser settings, in a similar manner to the selection of the at least one delay value. An equaliser may have a variation of delay across its pass band in a controllable fashion, and may be used to correct for a distortion to the first or second signal in the transmission path to the source of intermodulation products, or for distortion to the interference signal.

The generation of simulated intermodulation products was described in connection with FIG. 4 in terms of the generation of third order terms at baseband in order to cancel intermodulation products generated by cube terms in the transfer characteristic of a non-linear device. However, in addition to the generation of third order intermodulation products by cube terms in a device transfer function, intermodulation products may also be generated at the frequencies expected for third order products, such as $2f_1 - f_2$ and $2f_2 - f_1$, by terms in a device transfer function of powers 5, 7, 9, and potentially by any odd power device nonlinearities, where the power is at least as great as the power of the respective term of the device transfer function. Correspondingly, intermodulation products normally termed as 'fifth order' can actually be generated by device nonlinearities of powers 5, 7, 9, and all higher odd power device nonlinearities. The pattern continues in this way for all higher (odd) order intermodulation products (i.e. 'seventh', 'ninth' etc.), which can be generated not only by device nonlinearities of the same power, but also by device nonlinearities of higher odd powers. FIG. 10 shows a mathematical expansion illustrating the generation of intermodulation products by a power (exponent) 5 term in a device transfer function. The terms within broken lines have been highlighted as terms that may typically fall within a receive band in some arrangements of cellular radio uplink and downlink frequencies. In particular, the terms include cos(2a-b), and cos(a-2b), which correspond to the frequencies $2f_1 - f_2$ and $2f_2 - f_1$. Therefore, it may be seen that knowledge of (or guessing of) the mechanism for generating intermodulation products may be used to generate corresponding simulated intermodulation products.

Figure 11:
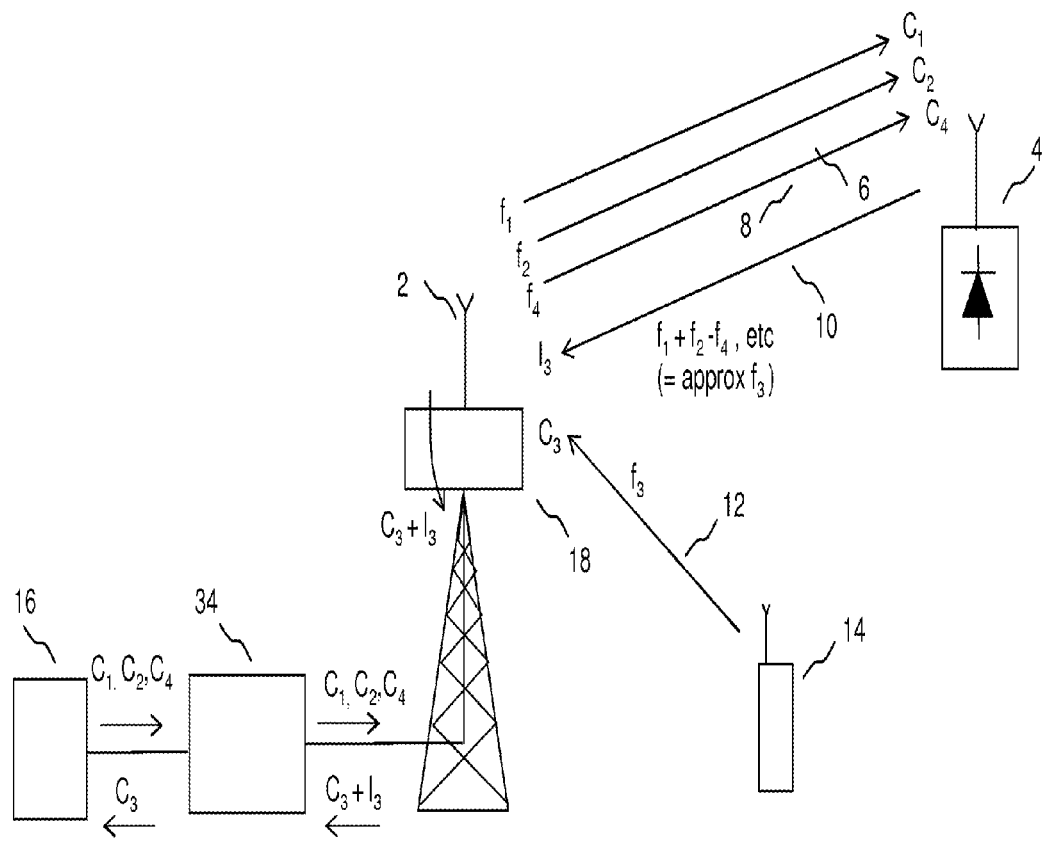
FIG. 11 is a schematic diagram illustrating reduction of interference caused by passive intermodulation, where the passive intermodulation is generated by mixing between three signals in a component external to the transmitter in an embodiment of the invention.

FIG. 11 illustrates that intermodulation products may be generated in a non-linear device by the mixing of three or more signals. In FIG. 11, three carriers $C_1$, $C_2$ and $C_4$, that is to say signals, are transmitted at frequencies $f_1$, $f_2$, and $f_4$ respectively. As shown, these may mix together to produce third order products such as $f_1 + f_2 - f_4$, that may fall within a receive band. Simulated intermodulation products may be generated by knowledge of the process by which the intermodulation products in interference to a receive signal are generated.

FIG. 12 is an example of a mathematical expansion showing the generation of intermodulation products of three signals by a cubic term of a non-linear device characteristic. The terms within broken lines have been highlighted as terms that may typically fall within a receive band in some arrangements of cellular radio uplink and downlink frequencies.

Figure 13:
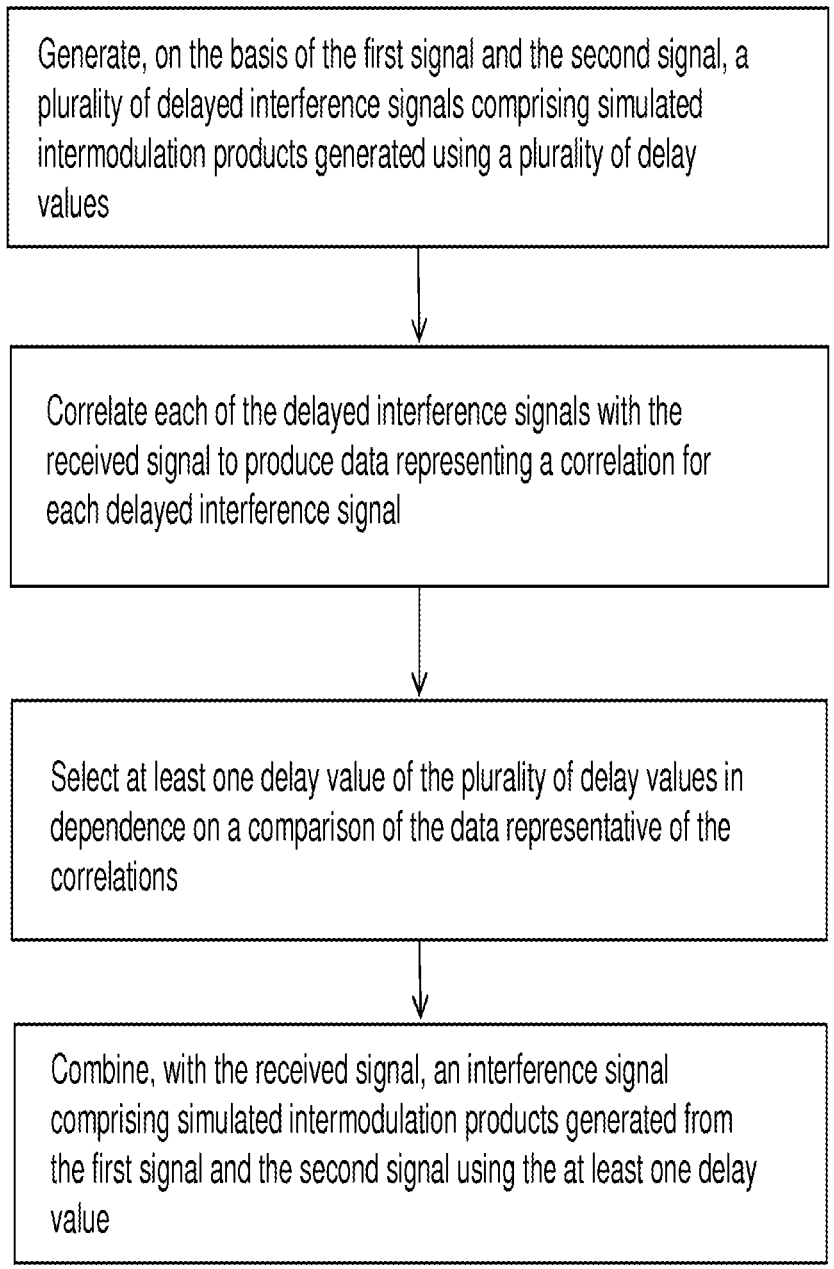
FIG. 13 is a flow diagram illustrating a method according to an embodiment of the invention.

FIG. 13 illustrates a flow diagram of a method according to an embodiment of the invention.

So, embodiments of the invention have been described in which a search is carried out for delay, frequency and/or amplitude values, for example by varying the values applied by blocks 64, 66, 68, 70, 72, 74, 76, 78, 83, 84 shown in FIG. 7, and choosing the combination of values of the various parameters in dependence on data representing the correlation value, typically the combination that produces the greatest magnitude. Similarly, referring to FIG. 4, a search is carried out for the values of delay in functional block 52, and/or frequency offset in block 50 in dependence on data representing the correlation, typically selecting the combination of values that maximises the correlation. The presence of a correlation peak indicates that intermodulation products have been detected, and detection of intermodulation products may be indicated if the data representing the correlation exceeds a predetermined threshold. Combination of simulated intermodulation products with the received signal may be dependent on the detection of intermodulation products. Alternatively, the amplitude of the weight value 58 in FIG. 4, or weight 92 in FIG. 7, for example, may be automatically set to a small value when the magnitude of the correlation is small.

The process of searching over multiple hypotheses about signal delays, amplitudes and phases may be arranged as a series of successive stages. For example, the search process may be split into the following sub-processes. Initially, a coarse acquisition process may be employed, whereby approximate phases, amplitudes, delays and/or frequencies are found by searching over many possibilities with relatively large steps and a relatively large search range. Following this, a finer acquisition process may be employed, using finer steps, focused more tightly around the values found by the coarse acquisition process. Then, a tracking mode may be employed, whereby the best solution is updated slowly in time, using an 'early-late-gate' approach, that is to say testing alternative hypothesis either side of the current best hypothesis, to track changes in parameters. This may reduce processor loading in comparison with the coarse and fine acquisition phases. As has been described, for example in connection with FIGS. 10 and 12, in embodiments of the invention, knowledge of the mathematics describing how the PIM is originally generated in the PIM source nonlinearity is used to generate a local replica of the PIM, that is to say simulated intermodulation products, which is used to cancel the actual PIM in the received signal by adding it in antiphase. The mathematics shows that the PIM signal is a deterministic function of the input signals, i.e. downlink transmissions, and is independent (apart from a frequency shift) of the frequency separation between those input signals. For different PIM-generating sources, the form of the signal from each exponent of nonlinearity is the same, apart from some arbitrary amplitude/phase scaling, assuming that the relative delays between different PIM sources are small compared to the correlation time of the signal. However, the relative power levels of the different intermodulation products might be different. A search may be carried out over different relative powers, and a combination of values may be selected that produces the greatest magnitude of correlation between the simulated intermodulation products and the intermodulation products in interference to the received signal. In an embodiment of the invention, the method of PIM cancellation consists of the following steps.

Firstly, generating a local replica of the PIM based on knowledge of the transmitted signal. Secondly, determining the exact phase, amplitude, delay and/or frequency offset of the PIM as it appears in the receive path by cross-correlating the aggregate uplink signal with the local replica. Thirdly, scaling, delaying and frequency shifting, if necessary, the local replica PIM and adding it to the aggregate uplink signal in antiphase to cancel the actual PIM.

In the case of MIMO transmissions, the processing is somewhat more complex, as described earlier. In the MIMO case, it may not be possible to determine the local replica of the PIM signal independently of the cross-correlation process. In the MIMO case both of these steps may be embedded within a loop which tests many different candidate local replicas, one for each hypothesis of the relative amplitude and phase of the multiple MIMO transmissions as they arrive at the PIM source. The winning hypothesis is the one, for example, giving the highest-energy cross-correlation, that is to say the data representing the correlation indicates the highest magnitude, in the second step. This represents the hypothesis which generates a local replica which is most like the actual received PIM. Once this best local replica has been determined, and its phase, amplitude, delay and frequency offset have also been found, the third step may be performed, and the local replica may be added in antiphase to cancel or reduce the actual PIM, that is to say the intermodulation products in the interference to the received signal.

FIG. 7 illustrates only a single-branch uplink receiver, operating on a single MIMO uplink data stream. However, a cellular base station typically has multiple uplink receive branches, typically having at least a main and a diversity receiver branch in each sector. A multiple branch receiver may be implemented by duplicating the functional blocks shown in FIG. 7. However, some of the processing for one branch may be common to the other, and a more efficient implementation may be achieved by sharing some functional blocks between MIMO data streams, that is to say receive channels, or branches, from respective MIMO antennas. For example, the determination of the relative amplitudes and phases of the MIMO transmit branches, as they impinge on the PIM source may be shared between MIMO receive branches, so that the winning hypothesis on one receive branch may be applied to another branch. Alternatively, each hypothesis, that is to say combination of trial phase and amplitude, may be tested in parallel on both receive branches, and metrics for each receive branch may be combined for each hypothesis. The different hypotheses may then be ranked, for example on the basis of correlation magnitude between the simulated intermodulation products and the intermodulation products in the received signal. This may make the best use of the available information. Other receive parameters which may be estimated in this combined fashion include delay and frequency offset, which might be common across the multiple receive branches, particularly if the receiver filters are well matched, or calibrated, for delay and if local oscillators are shared between branches, so that frequency offset would be expected to be the same between branches.

The above processing over multiple receive branches may yield information as to whether any PIM interference is generated internally to the RF subsystem or externally in the environment. For example, if the winning hypothesis about the relative amplitude and phases of two MIMO transmissions is the same on both receive branches, and each transmit branch makes a significant contribution to the overall PIM signal, then this may indicate that the PIM source is located in the external environment, since there are significant contributions from both transmit branches.

Exemplary embodiments of the invention and exemplary advantages are described as follows.

In an embodiment of the invention, the method comprises detecting an amplitude and phase of the correlation of the selected delayed interference signal; and weighting the interference signal in dependence on the detected amplitude and phase, wherein said combining comprises combining the weighted interference signal with the received signal.

This has the advantage that weighting, which may be a weighting in amplitude and phase, of the interference signal may be efficiently determined from the detected amplitude and phase of the correlation, so that the interference signal may be combined with the received signal with appropriate amplitude and phase to cancel, or at least reduce, the intermodulation products in the received signal.

In an embodiment of the invention, the method comprises processing the first signal and the second signal at baseband to produce baseband intermodulation products.

This has the advantage that the intermodulation products may be produced efficiently, since baseband processing may be carried out to produce baseband intermodulation products without reference to the radio frequency of the first or second signal when transmitted.

In an embodiment of the invention, the method comprises frequency shifting the baseband intermodulation products to produce the simulated intermodulation products.

This has the advantage that the baseband intermodulation products may be used to produce simulated intermodulation products that are aligned in frequency with the intermodulation products in the interference to the received signal, so that effective cancellation may take place. The baseband intermodulation products are at baseband for the frequency of a given intermodulation product of the first and second signal, for example a third or fifth order product. The frequency of the given product may have an arbitrary offset from the frequency of the received signal. Frequency shifting the baseband intermodulation products may enable the alignment by correcting the offset.

In an embodiment of the invention, the frequency shifting aligns the simulated intermodulation products in frequency with the intermodulation products in the interference to the received signal.

This has the advantage that, when the simulated intermodulation products are combined with the received signal, the intermodulation products in the interference to the received signal may be reduced or cancelled effectively.

In an embodiment of the invention, the frequency shifting comprises shifting by a frequency determined by at least a frequency of a channel in which the received signal is received, a frequency of the first radio frequency signal, and a frequency of the second radio frequency signal.

This has the advantage of aligning the simulated intermodulation products in frequency with the intermodulation products in the interference to the received signal. An offset between the frequency of the channel in which the received signal is received and the frequency of the intermodulation products in the interference to the received signal may be removed, since the frequency of the channel is known, and the frequency of the intermodulation products in the interference may be determined since it is dependent on the frequency of the first and second signals and the order of the intermodulation product.

In an embodiment of the invention, the frequency shifting comprises shifting by a frequency determined by at least an order of an intermodulation product in the interference to the received signal.

In an embodiment of the invention, the frequency shifting comprises shifting by a frequency determined by:

adjusting the frequency shift to a plurality of frequency shift values; and selecting a frequency for said frequency shifting shift on the basis of data representing a correlation of a delayed interference signal with the received signal for each of the plurality of frequency shift values.

This has the advantage that a frequency shift value may be adjusted to remove an unknown component to the offset between the frequency of the channel in which the received signal is received and the frequency of the intermodulation products in the interference to the received signal. The unknown component to the frequency offset may, for example, be caused by if the precise frequency relationship between frequencies used to upconvert the first and/or second signals and the frequency used to downconvert the received signal is not known.

In an embodiment of the invention, the method comprises deriving at least the first signal at baseband from a downlink sample stream from a base station baseband unit to a digital up-converter unit and deriving the received signal at baseband from an uplink sample stream from a digital down-converter unit to a base station baseband unit.

This has the advantage of proving a convenient source of baseband signals for generation of baseband intermodulation products. Typically, the baseband signals may be accessed without modifying the base station baseband unit or the digital downconverter unit.

In an embodiment of the invention both the first and second signal may be derived at baseband from the downlink sample stream.

In an embodiment of the invention, the uplink and downlink sample streams are Common Public Radio Interface (CPRI) data streams.

In an embodiment of the invention, the method comprises receiving at least the second signal from an antenna.

This has an advantage that at least the second signal may be received if a downlink datastream comprising at least the second signal is not available.

In an embodiment of the invention, the method comprises receiving the first signal and the second signal from an antenna.

In an embodiment of the invention, the first signal comprises at least a first component and a second component, each component having been transmitted from a different antenna, and the plurality of delay values comprises a plurality of delay values for the first component and a plurality of delay values for the second component, the method comprising:

for each of the plurality of delay values of the first component and for each of the plurality of delay values for the second component, correlating the respective delayed interference signal with the received signal to produce data representative of a correlation for each of a plurality of amplitude values and for each of a plurality of phase values for the second component;

selecting an amplitude value and a phase value of the second component, a delay value of the first component, and a delay value of the second component in dependence on a comparison of the data representative of the correlations; and generating said interference signal using the selected amplitude value and selected phase value of the second component, the selected delay value of the first component, and the selected delay value of the second component.

This has the advantage that interference may be reduced or cancelled that comprises intermodulation products of at least a first signal and a second signal, where the first signal has at least a first and a second component which have been transmitted from different antennas at the same frequency, for example MIMO (Multiple Input, Multiple Output) components.

In an embodiment of the invention, the plurality of amplitude values and the plurality of phase values of the second component are relative values, being relative to the amplitude and phase of the first component.

The advantage of determining relative amplitude and phase values of the components is that these relative values affect the vector sum of the components of the first signal at the source of the intermodulation products that are to be reduced or cancelled, so that simulated intermodulation products may be generated with a similar phase and amplitude relationship between the components of the first signal.

In an embodiment of the invention, the first signal comprises a further component of the first signal having been transmitted from an antenna not used to transmit the first component of the first signal or the second component of the first signal, and the plurality of delay values comprises a plurality of delay values for the further component, the method comprising:

for each of the plurality of delay values of the first component, for each of the plurality of delay values for the second component, and for each of the plurality of delay values of the further component, correlating the respective delayed interference signal with the received signal to produce data representative of a correlation for each of a plurality of amplitude values and for each of a plurality of phase values for each of the second and further components;

selecting an amplitude value and a phase value of each of the second component and the further component and a delay value of the first component, a delay value of the second component and a delay value of the further component in dependence on a comparison of the data representative of the correlations; and generating said interference signal using the selected amplitude value and the selected phase value of each of the second component and the further component and the selected delay value of the first component, the selected delay value of the second component and the selected delay value of the further component.

This has the advantage that intermodulation products of the first and second signal may be reduced or cancelled, when the first signal has at least three components, for example MIMO components.

In an embodiment of the invention, the second signal comprises at least a first component of the second signal and a second component of the second signal, each of the first and second components of the second signal having been transmitted from a different antenna from the antenna used to transmit the other, the method comprising:

for each of the plurality of delay values of the first component of the first signal, for each of the plurality of delay values for the second component of the first signal, for each of the plurality of delay values of the first component of the second signal, and for each of the plurality of delay values for the second component of the second signal, correlating the respective delayed interference signal with the received signal to produce data representative of a correlation for each of a plurality of amplitude values and for each of a plurality of phase values for each of the second component of the first signal and the second component of the second signal;

selecting an amplitude value and a phase value of the second component of the first signal and the second component of the second signal and a delay value of the first component of the first signal, a delay value of the second component of the first signal, a delay value of the first component of the second signal, and a delay value of the second component of the second signal in dependence on a comparison of the data representing the correlations; and generating said interference signal using the selected amplitude value and the selected phase value of the second component of the first signal and the second component of the second signal and the selected delay value of the first component of the first signal, the selected delay value of the second component of the first signal, the selected delay value of the first component of the second signal, and the selected delay value of the second component of the second signal.

This has the advantage that intermodulation products of the first and second signal may be reduced or cancelled, when both the first and second signals comprise components, for example MIMO components.

In an embodiment of the invention, each signal component is a Multiple Input Multiple Output (MIMO) stream.

In an embodiment of the invention, the at least one delay value comprises a value of a delay applied to simulated intermodulation products generated from the first and second signal to form the delayed interference signals.

This has the advantage that the delayed interference signals may be formed conveniently by delaying the simulated intermodulation products after they have been generated.

In an embodiment of the invention, the at least one delay value comprises a value of a delay applied to the first signal to form the delayed interference signals.

In an embodiment of the invention, the at least one delay value comprises a value of a delay applied to the second signal to form the delayed interference signals.

This has the advantage that the delayed interference signals may be formed by delaying the first signal before generating the simulated intermodulation products, to provide an alternative method of generating the simulated intermodulation products.

In an embodiment of the invention, the delay value applied to the first signal is different from the delay value applied to the second signal.

This has the advantage that the delay to the first and second signals before generating the simulated intermodulation products may be separately adjusted, which may be advantageous, for example, if the first and second signals are transmitted by different antennas.

In an embodiment of the invention, the apparatus comprises at least a first processing part and a second processing part, the first processing part being arranged to perform at least said steps of: correlating each of the delayed interference signals with the received signal to produce data representing a correlation for each delayed interference signal; and selecting at least one delay value of the plurality of delay values in dependence on a comparison of the data representative of the correlations, and the second processing part being arranged to perform at least the step of:

combining, with the received signal, an interference signal comprising simulated intermodulation products generated from the first signal and the second signal using the at least one delay value.

This has the advantage that the apparatus may be implemented efficiently, by using a type of technology appropriate to each processing part.

In an embodiment of the invention, the first processing part is arranged to send an indicator of the at least one selected delay value to the second processing part.

This has the advantage that the delay value may be selected by the first processing part using a first type of technology, such as software in a processor, and simulated intermodulation products may be generated by the second processing part in real time and combined with the received signal using a second type of technology appropriate to processing data in real time, such as a hardware programmable gate array.

In an embodiment of the invention, the first processing part comprises a processor and memory arranged to execute software instructions to generate the indicator of the at least one selected delay value.

In an embodiment of the invention, the second processing part is arranged to generate simulated intermodulation products at baseband from the first signal and the second signal using the at least one delay value indicated by the indicator.

In an embodiment of the invention, the second processing part is arranged to generate the simulated intermodulation products at baseband at a sampling rate of at least the sampling rate of the received signal.

This has the advantage that the second processing part may process data in real time, so that interference in the received signal may be continuously reduced or cancelled in real time, without introducing undue delay into the receive path for the uplink.

In an embodiment of the invention, the second processing part comprises a Field Programmable Gate Array (FPGA).

In an embodiment of the invention, the apparatus is arranged to be inserted into a data link between a base station modem unit and a radio head unit.

This has the advantage that the apparatus may be retrofitted in an existing installation as an appliqué unit, by breaking into the existing data link between the base station modem unit, which may be referred to as a baseband unit and a radio head unit, which may be referred to as an upconverter and or downconverter unit, and connecting the apparatus in series with the data link.

In an embodiment of the invention, the apparatus comprises a first interface for connection to the base station modem unit and a second interface for connection to the radio head unit, the first interface being arranged to receive downlink data representing at least the first signal and the second interface being arranged to receive uplink data representing at least the received signal, wherein the first interface is arranged to output modified uplink data representing at least the received signal in which the received signal is combined with the interference signal comprising simulated intermodulation products generated from the first signal and the second signal.

This has the advantage that a received signal in which the interference due to intermodulation products is reduced or cancelled may be provided to the baseband unit, so that the data capacity and/or coverage of the uplink may be improved, by exploiting the improved received signal quality in terms of carrier to interference ratio.

In an embodiment of the invention, the data link comprises Common Public Radio Interface (CPRI) data streams.

This is a convenient format for the data streams in the data link.

In an embodiment of the invention, the apparatus comprises an antenna for receiving at least the second signal.

This has an advantage that at least the second signal may be received if a downlink datastream comprising at least the second signal is not available.

In an embodiment of the invention, a single antenna may be used to receive both the first and second signals.

In an embodiment of the invention, the apparatus comprises a further antenna for receiving at least the first signal.

This has the advantage that a directional antenna may be used for receiving each of the first and second signals in the case that the source of the first and second signals is at a different direction with respect to the apparatus.

In an embodiment of the invention, the apparatus comprises a receiver arranged to receive at least the second signal from the antenna and to provide a baseband representation of the second signal for use in generating the interference signal comprising simulated intermodulation products.

This has the advantage that a baseband representation of the second signal may be provided in cases where access is not available to a data link on which the baseband representation of the second signal is available. It may be that the first signal is available from a data link but the second signal is not.

The apparatus may further comprise a second receiver arranged to receive at least the first signal from the antenna and to provide a baseband representation of the second signal for use in generating the interference signal comprising simulated intermodulation products.

In an embodiment of the invention, the first signal comprises at least a first component and a second component, each component having been transmitted from a different antenna, and the plurality of delay values comprises a plurality of delay values for the first component and a plurality of delay values for the second component, the apparatus being arranged to perform the steps of:

for each of the plurality of delay values of the first component and for each of the plurality of delay values for the second component, correlating the respective delayed interference signal with the received signal to produce data representative of a correlation for each of a plurality of amplitude values and for each of a plurality of phase values for the second component;

selecting an amplitude value and a phase value of the second component, a delay value of the first component, and a delay value of the second component in dependence on a comparison of the data representative of the correlations; and generating said interference signal using the selected amplitude value and selected phase value of the second component, the selected delay value of the first component, and the selected delay value of the second component.

This has the advantage that interference may be reduced or cancelled that comprises intermodulation products of at least a first signal and a second signal, where the first signal has at least a first and a second component which have been transmitted from different antennas at the same frequency, for example MIMO (Multiple Input, Multiple Output) components.

In an embodiment of the invention, the second signal comprises at least a first component of the second signal and a second component of the second signal, each of the first and second components of the second signal having been transmitted from a different antenna from the antenna used to transmit the other, the apparatus being arranged to perform the steps of:

for each of the plurality of delay values of the first component of the first signal, for each of the plurality of delay values for the second component of the first signal, for each of the plurality of delay values of the first component of the second signal, and for each of the plurality of delay values for the second component of the second signal, correlating the respective delayed interference signal with the received signal to produce data representative of a correlation for each of a plurality of amplitude values and for each of a plurality of phase values for each of the second component of the first signal and the second component of the second signal;

selecting an amplitude value and a phase value of the second component of the first signal and the second component of the second signal and a delay value of the first component of the first signal, a delay value of the second component of the first signal, a delay value of the first component of the second signal, and a delay value of the second component of the second signal in dependence on a comparison of the data representing the correlations; and generating said interference signal using the selected amplitude value and the selected phase value of the second component of the first signal and the second component of the second signal and the selected delay value of the first component of the first signal, the selected delay value of the second component of the first signal, the selected delay value of the first component of the second signal, and the selected delay value of the second component of the second signal.

This has the advantage that intermodulation products of the first and second signal may be reduced or cancelled, when both the first and second signals comprise components, for example MIMO components. In an embodiment of the invention, a non-transitory computer-readable storage medium comprises a set of computer-readable instructions stored thereon, which, when executed by a processing system, cause the processing system to control apparatus to carry out a method of reducing interference to a received signal in a wireless network, the interference comprising intermodulation products of at least a first signal and a second signal, the method comprising:

generating, on the basis of the first signal and the second signal, a plurality of delayed interference signals comprising simulated intermodulation products generated using a plurality of delay values;

correlating each of the delayed interference signals with the received signal to produce data representing a correlation for each delayed interference signal;

selecting at least one delay value of the plurality of delay values in dependence on a comparison of the data representative of the correlations; and combining, with the received signal, an interference signal comprising simulated intermodulation products generated from the first signal and the second signal using the at least one delay value.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of reducing interference to a received signal in a wireless channel received in a wireless network by an incoming signal receiver, the interference comprising passive intermodulation (PIM) products of at least a first signal and a second signal, the method comprising:
   generating, on the basis of the first signal and the second signal, a plurality of equalized interference signals comprising simulated PIM products generated using a plurality of equalizer settings;
   correlating each of the equalized interference signals with the received signal to produce data representing a correlation for each equalized interference signal;
   selecting first equalizer settings from the plurality of equalizer settings in dependence on a comparison of the data representative of the correlations; and
   combining, with the received signal, an interference signal comprising simulated PIM products generated from the first signal and the second signal using the first equalizer settings.

2. The method of claim 1, further comprising:
   detecting an amplitude and phase of the correlation of the selected equalized interference signal; and
   weighting the interference signal in dependence on the detected amplitude and phase,
   wherein said combining comprises combining the weighted interference signal with the received signal.

3. The method of claim 1, further comprising processing the first signal and the second signal at baseband to produce baseband intermodulation products.

4. The method of claim 3, further comprising frequency shifting the baseband intermodulation products to produce the simulated PIM products.

5. The method of claim 4, wherein said frequency shifting aligns the simulated PIM products in frequency with the PIM products in the interference to the received signal.

6. The method of claim 4, wherein said frequency shifting comprises shifting by a frequency determined by at least a frequency of a channel in which the received signal is received, a frequency of the first radio frequency signal, and a frequency of the second radio frequency signal.

7. The method of claim 6, wherein said frequency shifting comprises shifting by a frequency determined by at least an order of a PIM product in the interference to the received signal.

8. The method of claim 4, wherein said frequency shifting comprises shifting by a frequency determined by:
   adjusting the frequency shift to a plurality of frequency shift values; and
   selecting a frequency for said frequency shifting shift on the basis of data representing a correlation of an equalized interference signal with the received signal for each of the plurality of frequency shift values.

9. The method of claim 1, further comprising deriving at least the first signal at baseband from a downlink sample stream from a base station baseband unit to a digital up-converter unit and deriving the received signal at baseband from an uplink sample stream from a digital down-converter unit to a base station baseband unit.

10. The method of claim 9, wherein the uplink and downlink sample streams are Common Public Radio Interface (CPRI) data streams.

11. The method of claim 1, further comprising receiving at least the second signal from an antenna.

12. The method of claim 1, wherein the first signal comprises at least a first component and a second component, each component having been transmitted from a different antenna, and the plurality of equalizer settings comprises a plurality of equalizer settings for the first component and a plurality of equalizer settings for the second component, the method further comprising:
- for each of the plurality of equalizer settings of the first component and for each of the plurality of equalizer settings for the second component, correlating the respective equalized interference signal with the received signal to produce data representative of a correlation for each of a plurality of amplitude values and for each of a plurality of phase values for the second component;
- selecting an amplitude value and a phase value of the second component, equalizer settings of the first component, and an equalizer settings of the second component in dependence on a comparison of the data representative of the correlations; and
- generating said interference signal using the selected amplitude value and selected phase value of the second component, the selected equalizer settings of the first component, and the selected equalizer settings of the second component.

13. The method of claim 12, wherein the plurality of amplitude values and the plurality of phase values of the second component are relative values, being relative to the amplitude and phase of the first component.

14. The method of claim 12, wherein the first signal comprises a further component of the first signal having been transmitted from an antenna not used to transmit the first component of the first signal or the second component of the first signal, and the plurality of equalizer settings comprises a plurality of equalizer settings for the further component, the method further comprising:
- for each of the plurality of equalizer settings of the first component, for each of the plurality of equalizer settings for the second component, and for each of the plurality of equalizer settings of the further component, correlating the respective equalized interference signal with the received signal to produce data representative of a correlation for each of a plurality of amplitude values and for each of a plurality of phase values for each of the second and further components;
- selecting an amplitude value and a phase value of each of the second component and the further component and equalizer settings of the first component, equalizer settings of the second component and equalizer settings of the further component in dependence on a comparison of the data representative of the correlations; and
- generating said interference signal using the selected amplitude value and the selected phase value of each of the second component and the further component and the selected equalizer settings of the first component, the selected equalizer settings of the second component and the selected equalizer settings of the further component.

15. The method of claim 12, wherein the second signal comprises at least a first component of the second signal and a second component of the second signal, each of the first and second components of the second signal having been transmitted from a different antenna from the antenna used to transmit the other, the method further comprising:
- for each of the plurality of equalizer settings of the first component of the first signal, for each of the plurality of equalizer settings for the second component of the first signal, for each of the plurality of equalizer settings of the first component of the second signal, and for each of the plurality of equalizer settings for the second component of the second signal, correlating the respective equalized interference signal with the received signal to produce data representative of a correlation for each of a plurality of amplitude values and for each of a plurality of phase values for each of the second component of the first signal and the second component of the second signal;
- selecting an amplitude value and a phase value of the second component of the first signal and the second component of the second signal and equalizer settings of the first component of the first signal, equalizer settings of the second component of the first signal, equalizer settings of the first component of the second signal, and equalizer settings of the second component of the second signal in dependence on a comparison of the data representing the correlations; and
- generating said interference signal using the selected amplitude value and the selected phase value of the second component of the first signal and the second component of the second signal and the selected equalizer settings of the first component of the first signal, the selected equalizer settings of the second component of the first signal, the selected equalizer settings of the first component of the second signal, and the selected equalizer settings of the second component of the second signal.

16. The method of claim 12, wherein each component of each signal is a Multiple Input Multiple Output (MIMO) stream.

17. The method of claim 1, wherein said first equalizer settings comprise settings of an equalizer applied to simulated PIM products generated from the first and second signal to form the equalized interference signals.

18. The method of claim 1, wherein said first equalizer settings comprise settings of an equalizer applied to the first signal to form the equalized interference signals.

19. The method of claim 18, wherein the settings of the equalizer applied to the first signal are different from the settings of the equalizer applied to the second signal.

20. An apparatus for reducing interference to a received signal in a wireless channel received in a wireless network by an incoming signal receiver, the interference comprising passive intermodulation (PIM) products of at least a first signal and a second signal, the apparatus comprising:
- at least one processor; and
- at least one memory including computer program code;
- the at least one memory and the computer program code being configured to, with the at least one processor, cause the apparatus to at least perform steps of:
- generating, on the basis of the first signal and the second signal, a plurality of equalized interference signals comprising simulated PIM products generated using a plurality of equalizer settings;
- correlating each of the equalized interference signals with the received signal to produce data representing a correlation for each equalized interference signal;
- selecting first equalizer settings from the plurality of equalizer settings in dependence on a comparison of the data representative of the correlations; and
- combining, with the received signal, an interference signal comprising simulated PIM products generated from the first signal and the second signal using the first equalizer settings.

* * * * *